(12) United States Patent
Suh et al.

(10) Patent No.: US 11,503,512 B2
(45) Date of Patent: Nov. 15, 2022

(54) APPARATUS AND METHOD FOR NETWORK SECURITY

(71) Applicant: Samsung Electronics Co., Ltd., Suwon-si (KR)

(72) Inventors: Kyungjoo Suh, Suwon-si (KR); Youngkyo Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/957,373

(22) PCT Filed: Jan. 11, 2019

(86) PCT No.: PCT/KR2019/000508
§ 371 (c)(1),
(2) Date: Jun. 23, 2020

(87) PCT Pub. No.: WO2019/139427
PCT Pub. Date: Jul. 18, 2019

(65) Prior Publication Data
US 2020/0336952 A1     Oct. 22, 2020

(30) Foreign Application Priority Data

Jan. 12, 2018   (KR) .................. 10-2018-0004717

(51) Int. Cl.
*H04W 36/00*   (2009.01)
*H04W 36/14*   (2009.01)
*H04W 12/041*  (2021.01)

(52) U.S. Cl.
CPC ..... *H04W 36/0038* (2013.01); *H04W 12/041* (2021.01); *H04W 36/0016* (2013.01); *H04W 36/14* (2013.01)

(58) Field of Classification Search
CPC ......... H04W 36/0038; H04W 12/0401; H04W 36/0016; H04W 36/14; H04W 12/03;
(Continued)

(56) References Cited

U.S. PATENT DOCUMENTS

2013/0102270 A1* 4/2013 Suh ............... H04W 12/037
455/404.1
2018/0007557 A1   1/2018 Lee et al.
(Continued)

FOREIGN PATENT DOCUMENTS

WO   2017/146777 A1   8/2017
WO   2017/188758 A1   11/2017
WO   2018/008943 A1   1/2018

OTHER PUBLICATIONS

Handover procedures between 5GS and EPS with N26, 3GPP TSG SA WG3 (security) Meetiing #89 2017, S3-173172 (Year: 2017).*

(Continued)

*Primary Examiner* — Hirdepal Singh

(57) ABSTRACT

The present disclosure relates to a 5th generation (5G) or pre-5G communication system for supporting a higher data transfer rate beyond a 4th generation (4G) communication system, such as long-term evolution (LTE). According to various embodiments of the present disclosure, a security method of a mobility management apparatus of a second system in a wireless environment may comprise the steps of: receiving a handover request for a terminal connected to a first system; transmitting the handover request to a base station of the second system; and receiving a handover ACK including security information generated by the base station of the second system and transmitting the same to the first system.

20 Claims, 4 Drawing Sheets

(58) Field of Classification Search
CPC ... H04W 12/04; H04W 12/041; H04W 12/10; H04W 36/00
USPC .......................................................... 455/411
See application file for complete search history.

(56) References Cited

U.S. PATENT DOCUMENTS

| | | | | |
|---|---|---|---|---|
| 2018/0083972 | A1* | 3/2018 | Kim | H04L 63/205 |
| 2018/0376384 | A1* | 12/2018 | Youn | H04W 92/02 |
| 2019/0141776 | A1 | 5/2019 | Kim et al. | |
| 2019/0159025 | A1* | 5/2019 | Ben Henda | H04W 36/14 |
| 2019/0191348 | A1* | 6/2019 | Futaki | H04W 36/0033 |
| 2020/0008054 | A1* | 1/2020 | Wifvesson | H04W 36/14 |
| 2020/0022031 | A1* | 1/2020 | Li | H04W 36/0022 |
| 2020/0178068 | A1* | 6/2020 | Muhanna | H04W 12/60 |
| 2020/0322850 | A1* | 10/2020 | Zhu | H04W 36/0022 |

OTHER PUBLICATIONS ("Security Architecture and Procedures for 5G System (Release 15)" 3GPP TS 33.501 V0.6.0. (Year: 2017).*
"3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1 (Mar. 2020), 666 pages.
"3rd Generation Partnership Project; Technical Specification Group Radio Access Network; NR; Radio Resource Control (RRC) protocol specification (Release 16)", 3GPP TS 38.331 V16.0.0 (Mar. 2020), 835 pages.
"3rd Generation Partnership Project; Technical Specification Group Services and System Aspects; Procedures for the 5G System; Stage 2 (Release 15)", 3GPP TS 23.502 V15.0.0 (Dec. 2017), 257 pages.
"3rd Generation Partnership Project; Technical Specification Group Services and System Aspects; Security Architecture and Procedures for 5G System (Release 15), 3GPP TS 33.501 V0.6.0 (Dec. 2017)", 3GPP TS 33.501 V0.6.0 (Dec. 2017), 75 pages.
International Search Report dated Apr. 19, 2019 in connection with International Patent Application No. PCT/KR2019/000508, 2 pages.
Written Opinion of the International Searching Authority dated Apr. 19, 2019 in connection with International Patent Application No. PCT/KR2019/000508, 6 pages.
"3rd Generation Partnership Project; Technical Specification Group Services and System Aspects; Security Architecture and Procedures for 5G System (Release 15)", 3GPP TS 33.501 V0.6.0 (Dec. 2017), 79 pages.
Nokia, "Idle mode mobility from 4G to 5G", 3GPP TSG SA WG3 (Security) Meeting #88-Bis, Oct. 9-13, 2017, S3-172429, 5 pages.
Huawei, Hisilcon, "Handover procedures between 5GS and EPS with N26", 3GPP TSG WG3 (Security) Meeting #89, Nov. 27-Dec. 1, 2017, S3-173172, 4 pages.
Notice of Preliminary Rejection dated Nov. 22, 2021 in connection with Korean Patent Application No. 10-2018-0004717, 14 pages.

* cited by examiner

APPARATUS AND METHOD FOR NETWORK SECURITY

CROSS-REFERENCE TO RELATED APPLICATIONS

This application is a 371 of International Application No. PCT/KR2019/000508 filed on Jan. 11, 2019, which claims priority to Korean Patent Application No. 10-2018-0004717 filed on Jan. 12, 2018, the disclosures of which are herein incorporated by reference in their entirety.

BACKGROUND

1. Field

The present disclosure relates generally to a wireless communication system, and more specifically, to an apparatus and method for network security in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is developing hybrid frequency shift keying and quadrature amplitude modulation (FQAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

The following descriptions provide an apparatus and a method for security of a user equipment and a network. In addition, they provide the security apparatus and method if the user equipment moves between different networks, for example, between a 5th generation (5G) network and a 4G long term evolution (LTE) network, or if the user equipment hands over.

SUMMARY

According to various embodiments of the present disclosure, a security method of a mobility management device of a second system in a wireless environment may include receiving a handover request for a user equipment connected to a first system, transmitting the handover request to a base station of the second system, and receiving and transmitting a handover ACK including security information generated at the base station of the second system to the first system.

If a user equipment performs communication, particularly, hands over to a $5^{th}$ generation (5G) system under an environment where the 5G system and a long term evolution (LTE) system exist together, or if the user equipment hands over from the 5G system to the LTE system, data communication and a security procedure of the user equipment and the network may be conducted efficiently by providing a method which transmits user equipment (UE) information, specifically, security information of the UE and utilizing it.

To support integrity and ciphering of messages transmitted to the UE and the network in the 5G system, the security procedure may be efficiently performed in the communication between the UE and the network by performing a procedure for transmitting information between the UE and a network entity.

Effects obtainable from the present disclosure are not limited to the above mentioned effects, and other effects which are not mentioned may be clearly understood by those skilled in the technical field of the present disclosure through the following descriptions.

DETAILED DESCRIPTION

Figure 1:
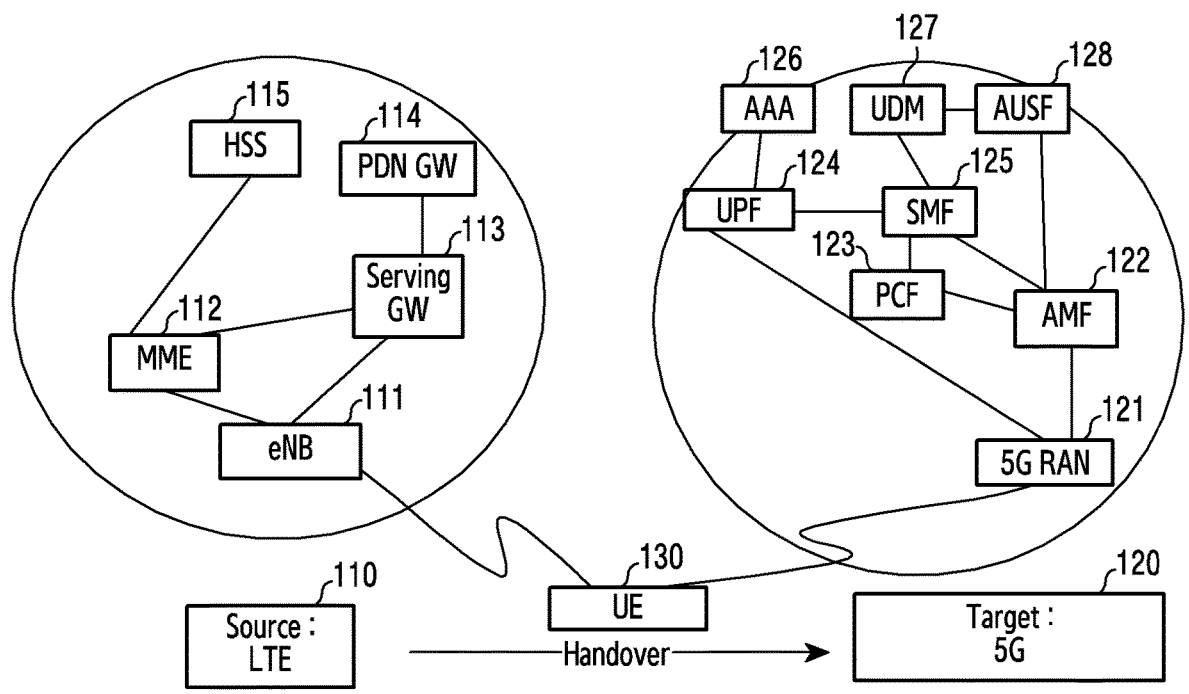
FIG. 1 illustrates an example of a network environment in which a 5G system and a long term evolution (LTE) system exist together according to an embodiment.

The terms used in the present disclosure are only used to describe specific embodiments, and are not intended to limit other embodiments. Singular expressions may include plural expressions as well unless the context clearly indicates otherwise. All terms used herein, including technical and scientific terms, may have the same meaning as those commonly understood by a person skilled in the art to which the present disclosure pertains. Terms such as those defined in a generally used dictionary among the terms used in the present disclosure may be interpreted to have the meanings equal or similar to the contextual meanings in the relevant field of art, and are not to be interpreted to have ideal or excessively formal meanings unless clearly defined in the present disclosure. In some cases, even a term defined in the present disclosure should not be interpreted to exclude embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, preferred embodiments of the present disclosure will be described in detail with reference to the accompanying drawings. At this time, it should be noted that the same reference numerals are used to designate the same elements throughout the drawings. In addition, well-known functions or constructions which would obscure the subject matter of the present disclosure shall be omitted.

The present specification explains embodiments by omitting techniques which are well known in the art to which the present disclosure belongs and is not directly related to the present disclosure. This is to clarify the subject matter of the present disclosure without obscuring it by eliminating unnecessary descriptions.

Some components in the attached drawings are exaggerated, omitted, or schematically shown for the same reason. In addition, the size of each element does not utterly reflect an actual size. Identical or corresponding components in each drawing have been given the same reference numbers.

Advantages and features of the present disclosure, and a method for accomplishing them will be clarified by referring to embodiments elucidated in conjunction with the accompanying drawings. However, the present disclosure is not limited to the embodiments set forth herein but may be embodied in many different forms, and the present embodiments are provided to complete the disclosure and to indicate the full scope of the invention to those skilled in the art to which the present disclosure belongs. Like reference numerals indicate like elements throughout the specification.

Terms for identifying access nodes, terms indicating network entities, terms indicating messages, terms indicating interfaces between network entities, and terms indicating various identification information, which are used in the following descriptions, are for the sake of explanations. Accordingly, the present invention is not limited to the terms to be described, and may use other terms having technically identical meaning.

Hereafter, for the sake of explanations, the present invention uses terms and names defined in a standard for 5th generation (5G) and long term evolution (LTE) systems. However, the present invention is not limited by the terms and the names, and may be equally applied to a system which confirms to other standard.

That is, while embodiments of the present disclosure mainly targets at a communication specification standardized by 3rd generation partnership project (3GPP) in their specific descriptions, salient features of the present disclosure may be applied to other communication systems having a similar technical background, with slight modifications, without departing from the scope of the present disclosure, which may be determined by a person having skilled technical knowledge in the art of the present disclosure.

The present descriptions generally relate to wireless communications, and more specifically, to security measures for a network in a next-generation wireless environment. More particularly, they relate measures for transferring user equipment and network data applied to a next-generation 5G communication and/or an LTE communication system, a method for transferring information of the user equipment and the network, and an apparatus for performing the same.

In 5G mobile communication, an access and mobility management function (AMF) which is a management entity for managing mobility of the user equipment and a session management function (SMF) which is an entity for managing a session are separately operated. Unlike an operation scheme which manages a mobile management entity (MME) together in a conventional 4G LTE communication, since the entities for the mobility management and the session management are separated, a communication scheme and a communication management scheme between the user equipment and the network entity need to change.

First Embodiment

FIG. 1 illustrates an example of a network environment if a user equipment hands over in a network where a 5G system and an LTE system exist together according to an embodiment.

Referring to the drawing, a 5G network 120 according to an embodiment may include, for example, a user plane function (UPF) 124, an SMF 125, an AMF 122, a 5G radio access network (RAN) 121, a user data management (UDM) 127, and a policy control function (PCF) 123. Also, the network may include, for example, an authentication server function (AUSF) 128 and an authentication, authorization and accounting (AAA) 126 for authentication of entities. In the following description, a 5G network is assumed and described as an example of a communication network for convenience of explanation, but it may be applied to other network system if the same concept is applied within a scope understood by a person having ordinary skill in the art.

According to an embodiment, a 3GPP evolved packet system (EPS) structure is illustrated an example of another network which exists together with the 5G network and in which a user equipment (UE) performs handover. In this case, an evolved universal mobile telecommunications system (EUTRAN) is mainly described, and such a method may be used in other similar mobile communication system.

Referring to FIG. 1, a UE 130 may include various devices such as an electronic device, a conventional mobile UE, various devices which perform machine type communication, and consumer devices.

In FIG. 1, the UE 130 may perform general EUTRAN communication through an evolved nodeB (eNB) 111 and an MME 112, and perform data communication through a serving gateway 113 and a packet data network (PDN) gateway 114. Meanwhile, a home subscriber server (HSS) 115 may be included to transmit subscription information of the UE and UE related security key information.

Hereinafter, a method for supporting communication establishment process and operation of the UE in the network described with reference to FIG. 1 is explained. Based on protocols used in mobile communication and/or Internet communication, entities such as the eNB, the MME, and the HSS included in the above-described network may support the communication establishment process and operation of the UE.

Figure 2:
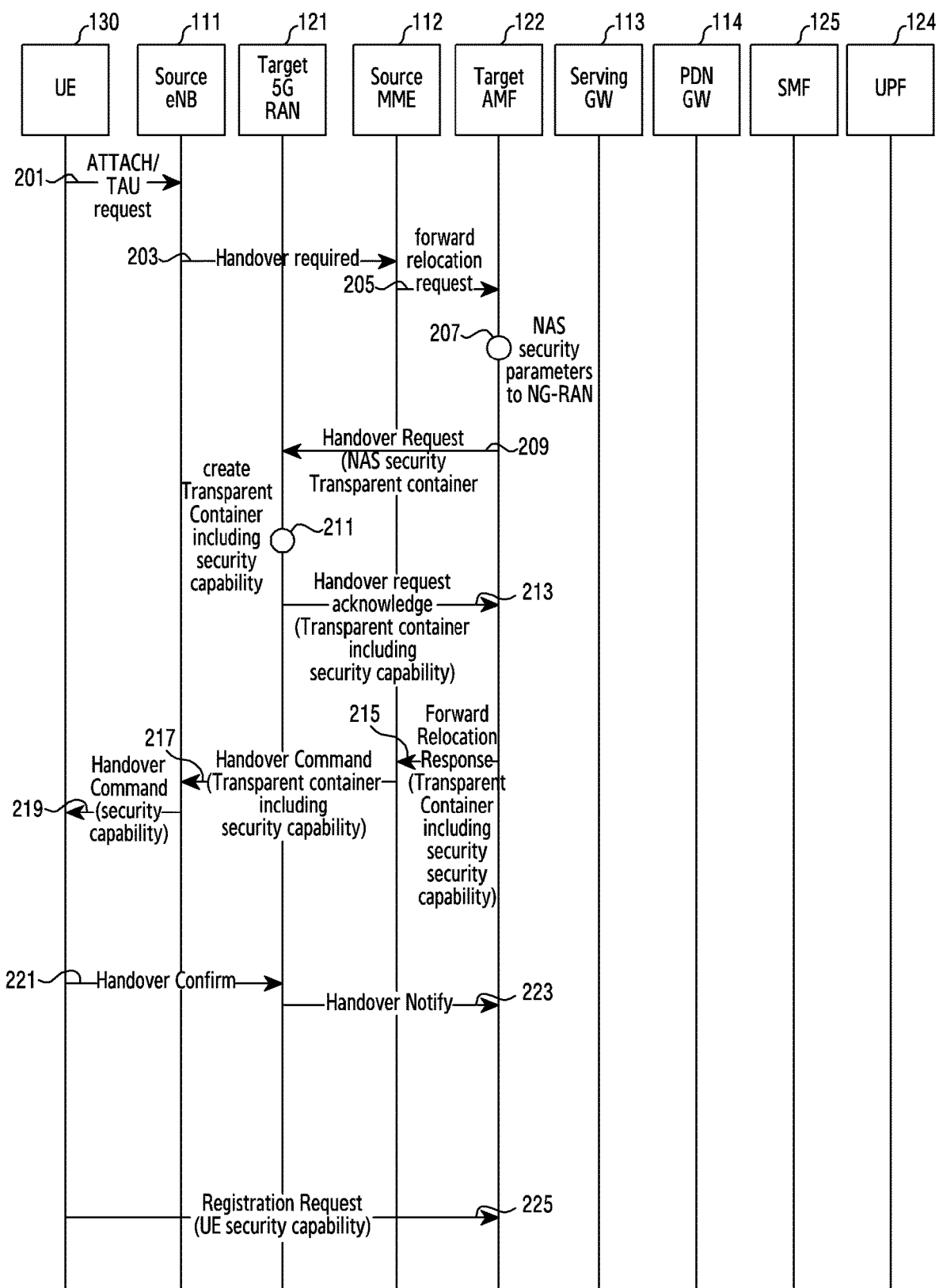
FIG. 2 illustrates an example of a security procedure if a user equipment hands over in an environment in which a 5G system and an LTE system exist together according to an embodiment.

FIG. 2 illustrates an example of a security procedure if a UE hands over in an environment where a 5G system and an LTE system coexist according to an embodiment.

In step 201, a UE 130 transmits an Attach request to a source eNB 111 to indicate a state in which the UE 130 is connected to the source eNB 111.

In step 203, the source eNB 111 transmits a handover required message to a source MME 112.

In step 205, the source MME 112 transmits a forward relocation request message to a target AMF 122.

In step 207, the target AMF 122 generates a non-access stratum (NAS) security parameters to NG-RAN information element. This will be described in detail later.

In step 209, the target AMF 122 transmits a handover request message to a target 5G-RAN 121. This message may include a NAS security transparent container, and the NAS security parameters to NG-RAN information element generated in step 207 may be transmitted in the NAS security transparent container.

In step 211, the target 5G-RAN 121 generates a transparent container. The transparent container may include security capability information as information used in a radio resource control (RRC) message thereafter.

In step 213, the target 5G RAN 121 transmits a handover request acknowledgment message to the target AMF 122. At this time, the transparent container generated in step 211 is transmitted together with security capability information.

In step 215, the target AMF 122 transmits a forward relocation response message to the source MME 112.

In step 217, the source MME 112 transmits a handover command to the source eNB 111, wherein the transparent container including the security capability information generated in step 211 is transmitted together.

In step 219, the source eNB 111 transmits a handover command message including the security capability to the UE 130.

In step 221, the UE 130 transmits a handover confirm message to the target 5G RAN 121.

In step 223, the target 5G-RAN 121 transmits a handover Notify message to the target AMF 122.

In step 225, the UE 130 transmits a registration request to the target AMF 122 using UE security capability.

Hereinafter, an example of the NAS security parameters to NR information element of step 207 shall be described.

The NAS security parameters to NR information element may be regarded as a container generated to transfer the security parameter required for the UE to generate security context from the AMF to the UE. Accordingly, the UE may generate 5G security context if the UE hands over to the 5G using the information parameters of the container shown in examples of the following tables.

Herein, the 5G security context may mean 5G NAS security context or 5G security access stratum (AS) security context. In particular, the 5G AS security context may also include AS security context for 3GPP access or AS security context for non 3GPP access.

Embodiments of the 5G security context may include Kamf, Key set identifier (KSIamf), UE security capabilities, uplink NAS count, downlink NAS count, next hop parameter, next hop chaining counter parameter, and the like.

The NAS security parameters to NR information element may be used so that the UE 130 generates mapped NR security context and uses this context after an inter system handover. The UE 130 may generate the mapped NR security context using the NAS security parameters to NR information element, and thus use the generated NR security context after the inter system handover. Herein, the NR security context may be referred to as 5G security context.

Table 1 shows an example of the NAS security parameters to NR information element configuration.

TABLE 1

| 8 | 7 | 6 | 5 | 4 | 3 | 2 | 1 | |
|---|---|---|---|---|---|---|---|---|
| NAS security parameters to NR IEI | | | | | | | | octet 1 |
| Nonce $_{AMF}$ value | | | | | | | | octet 2 octet 5 |
| 0 spare | Type of ciphering algorithm | | | 0 spare | Type of integrity protection algorithm | | | octet 6 |
| 0 spare | 0 | 0 | 0 | TSC | 5G NAS key set identifier | | | octet 7 |

Table 2 shows another example of the NAS security parameters to NR information element configuration.

TABLE 2

| 8 | 7 | 6 | 5 | 4 | 3 | 2 | 1 | |
|---|---|---|---|---|---|---|---|---|
| NAS security parameters to NR IEI | | | | | | | | octet 1 |
| Nonce $_{AMF}$ value | | | | | | | | octet 2 octet 5 |
| Type of ciphering algorithm | | | | Type of integrity protection algorithm | | | | octet 6 |
| 0 spare | 0 | 0 | 0 | TSC | 5G NAS key set identifier | | | octet 7 |

Table 3 shows yet another example of the NAS security parameters to NR information element configuration.

TABLE 3

| 8 | 7 | 6 | 5 | 4 | 3 | 2 | 1 | |
|---|---|---|---|---|---|---|---|---|
| NAS security parameters to NR IEI | | | | | | | | octet 1 |
| Nonce $_{AMF}$ value | | | | | | | | octet 2 octet 5 |
| Type of ciphering algorithm | | | | Type of integrity protection algorithm | | | | octet 6 |
| 0 Spare | 0 | 0 | TSC | | 5G NAS key set identifier | | | octet 7 |

Table 4 shows still another example of the NAS security parameters to NR information element configuration.

TABLE 4

| 8 | 7 | 6 | 5 | 4 | 3 | 2 | 1 | |
|---|---|---|---|---|---|---|---|---|
| NAS security parameters to NR IEI | | | | | | | | octet 1 |
| Nonce $_{AMF}$ value | | | | | | | | octet 2 octet 5 |
| Type of ciphering algorithm | | | | Type of integrity protection algorithm | | | | octet 6 |
| TSC | | spare | | | 5G NAS key set identifier | | | octet 7 |

The Nonce$_{AMF}$ value may be configured from octet 2 to octet 5 and may be configured as follows.

For example, Nonce may be configured as a binary representation, and may be configured such that bit 8 of Octet 2 is the most significant bit and bit 1 of Octet 5 is the least significant bit.

That is, Nonce$_{AMF}$ may be configured as the nonce value of the Nonce information element, and may be configured as shown in the following Table 5.

TABLE 5

| 8 | 7 | 6 | 5 | 4 | 3 | 2 | 1 | |
|---|---|---|---|---|---|---|---|---|
| Nonce IEI | | | | | | | | octet 1 |
| Nonce value | | | | | | | | octet 2 octet 5 |

In Table 5, Nonce may be configured with the binary representation, and may be configured such that bit 8 of Octet 2 is the most significant bit and bit 1 of Octet 5 is the least significant bit.

According to an embodiment, the Type of integrity protection algorithm and the Type of ciphering algorithm may be configured as shown in the following Table 6. In the following Table 6 and other tables to be described below, 5G-IA may indicate 5G integrity algorithm and 5G-EA may indicate an encryption algorithm of the 5G security algorithm. Also, 128-5G-IA and 128-5G-EA may indicate a 5G integrity algorithm and a 5G encryption algorithm using a 128-bit key.

Herein, the Type of integrity protection algorithm and the Type of ciphering algorithm may be used to represent algorithms used for ciphering and integrity protection.

TABLE 6

Type of integrity protection algorithm (octet 6, bit 1 to 3)
Bits

| 3 | 2 | 1 | |
|---|---|---|---|
| 0 | 0 | 0 | 5G integrity algorithm 5G-IA0 (null integrity protection algorithm) |
| 0 | 0 | 1 | 5G integrity algorithm 128-5G-IA1 |
| 0 | 1 | 0 | 5G integrity algorithm 128-5G-IA2 |
| 0 | 1 | 1 | 5G integrity algorithm 128-5G-IA3 |
| 1 | 0 | 0 | 5G integrity algorithm 5G-IA4 |
| 1 | 0 | 1 | 5G integrity algorithm 5G-IA5 |
| 1 | 1 | 0 | 5G integrity algorithm 5G-IA6 |
| 1 | 1 | 1 | 5G integrity algorithm 5G-IA7 |

Type of ciphering algorithm (octet 6, bit 5 to 7)
Bits

| 7 | 6 | 5 | |
|---|---|---|---|
| 0 | 0 | 0 | 5G encryption algorithm 5G-EA0 (null ciphering algorithm) |
| 0 | 0 | 1 | 5G encryption algorithm 128-5G-EA1 |
| 0 | 1 | 0 | 5G encryption algorithm 128-5G-EA2 |
| 0 | 1 | 1 | 5G encryption algorithm 128-5G-EA3 |
| 1 | 0 | 0 | 5G encryption algorithm 5G-EA4 |
| 1 | 0 | 1 | 5G encryption algorithm 5G-EA5 |
| 1 | 1 | 0 | 5G encryption algorithm 5G-EA6 |
| 1 | 1 | 1 | 5G encryption algorithm 5G-EA7 |

Bit 4 and 8 of octet 2 are spare and shall be coded as zero.

According to an embodiment, the Type of integrity protection algorithm and the Type of ciphering algorithm may be configured as shown in the following Table 7.

Herein, the Type of integrity protection algorithm and the Type of ciphering algorithm may be used to represent the algorithms used for the ciphering and the integrity protection.

TABLE 7

Type of integrity protection algorithm (octet 6, bit 1 to 4)
Bits

| 4 | 3 | 2 | 1 | |
|---|---|---|---|---|
| 0 | 0 | 0 | 0 | 5G integrity algorithm 5G-IA0 (null integrity protection algorithm) |
| 0 | 0 | 0 | 1 | 5G integrity algorithm 128-5G-IA1 |
| 0 | 0 | 1 | 0 | 5G integrity algorithm 128-5G-IA2 |
| 0 | 0 | 1 | 1 | 5G integrity algorithm 128-5G-IA3 |
| 0 | 1 | 0 | 0 | 5G integrity algorithm 5G-IA4 |
| 0 | 1 | 0 | 1 | 5G integrity algorithm 5G-IA5 |
| 0 | 1 | 1 | 0 | 5G integrity algorithm 5G-IA6 |
| 0 | 1 | 1 | 1 | 5G integrity algorithm 5G-IA7 |
| 1 | 0 | 0 | 0 | 5G integrity algorithm 5G-IA8 |
| 1 | 0 | 0 | 1 | 5G integrity algorithm 5G-IA9 |
| 1 | 0 | 1 | 0 | 5G integrity algorithm 5G-IA10 |
| 1 | 0 | 1 | 1 | 5G integrity algorithm 5G-IA11 |
| 1 | 1 | 0 | 0 | 5G integrity algorithm 5G-IA12 |
| 1 | 1 | 0 | 1 | 5G integrity algorithm 5G-IA13 |
| 1 | 1 | 1 | 0 | 5G integrity algorithm 5G-IA14 |
| 1 | 1 | 1 | 1 | 5G integrity algorithm 5G-IA15 |

Type of ciphering algorithm (octet 6, bit 5 to 8)
Bits

| 8 | 7 | 6 | 5 | |
|---|---|---|---|---|
| 0 | 0 | 0 | 0 | 5G encryption algorithm 5G-EA0 (null ciphering algorithm) |
| 0 | 0 | 0 | 1 | 5G encryption algorithm 128-5G-EA1 |
| 0 | 0 | 1 | 0 | 5G encryption algorithm 128-5G-EA2 |
| 0 | 0 | 1 | 1 | 5G encryption algorithm 128-5G-EA3 |
| 0 | 1 | 0 | 0 | 5G encryption algorithm 5G-EA4 |
| 0 | 1 | 0 | 1 | 5G encryption algorithm 5G-EA5 |
| 0 | 1 | 1 | 0 | 5G encryption algorithm 5G-EA6 |
| 0 | 1 | 1 | 1 | 5G encryption algorithm 5G-EA7 |
| 1 | 0 | 0 | 0 | 5G encryption algorithm 5G-EA8 |
| 1 | 0 | 0 | 1 | 5G encryption algorithm 5G-EA9 |
| 1 | 0 | 1 | 0 | 5G encryption algorithm 5G-EA10 |
| 1 | 0 | 1 | 1 | 5G encryption algorithm 5G-EA11 |
| 1 | 1 | 0 | 0 | 5G encryption algorithm 5G-EA12 |
| 1 | 1 | 0 | 1 | 5G encryption algorithm 5G-EA13 |
| 1 | 1 | 1 | 0 | 5G encryption algorithm 5G-EA14 |
| 1 | 1 | 1 | 1 | 5G encryption algorithm 5G-EA15 |

According to an embodiment, the Type of integrity protection algorithm and the Type of ciphering algorithm may be configured as Type of ciphering algorithm and Type of integrity protection algorithm of the 5G NAS security algorithms information element of the following Table 8. The configuration of the above values may be configured as shown in Table 9.

TABLE 8

| 8 | 7 | 6 | 5 | 4 | 3 | 2 | 1 | |
|---|---|---|---|---|---|---|---|---|
| 5G NAS security algorithms IEI | | | | | | | | octet 1 |
| 0 spare | Type of ciphering algorithm | | | 0 spare | Type of integrity protection algorithm | | | octet 2 |

TABLE 9

Type of integrity protection algorithm (octet 2, bit 1 to 3)
Bits

| 3 | 2 | 1 | |
|---|---|---|---|
| 0 | 0 | 0 | 5G integrity algorithm 5G-IA0 (null integrity protection algorithm) |
| 0 | 0 | 1 | 5G integrity algorithm 128-5G-IA1 |
| 0 | 1 | 0 | 5G integrity algorithm 128-5G-IA2 |
| 0 | 1 | 1 | 5G integrity algorithm 128-5G-IA3 |
| 1 | 0 | 0 | 5G integrity algorithm 5G-IA4 |
| 1 | 0 | 1 | 5G integrity algorithm 5G-IA5 |
| 1 | 1 | 0 | 5G integrity algorithm 5G-IA6 |
| 1 | 1 | 1 | 5G integrity algorithm 5G-IA7 |

Type of ciphering algorithm (octet 2, bit 5 to 7)
Bits

| 7 | 6 | 5 | |
|---|---|---|---|
| 0 | 0 | 0 | 5G encryption algorithm 5G-EA0 (null ciphering algorithm) |
| 0 | 0 | 1 | 5G encryption algorithm 128-5G-EA1 |
| 0 | 1 | 0 | 5G encryption algorithm 128-5G-EA2 |
| 0 | 1 | 1 | 5G encryption algorithm 128-5G-EA3 |
| 1 | 0 | 0 | 5G encryption algorithm 5G-EA4 |
| 1 | 0 | 1 | 5G encryption algorithm 5G-EA5 |
| 1 | 1 | 0 | 5G encryption algorithm 5G-EA6 |
| 1 | 1 | 1 | 5G encryption algorithm 5G-EA7 |

Bit 4 and 8 of octet 2 are spare and shall be coded as zero.

According to an embodiment, the Type of integrity protection algorithm and the Type of ciphering algorithm may be configured as Type of cipher algorithm and Type of integrity protection algorithm of the 5G NAS security algorithms information element of the following Table 10. Herein, the configuration of the above values may be configured as shown in Table 11. The Type of integrity protection algorithm and the Type of ciphering algorithm may be used to represent algorithms used for the ciphering and the integrity protection.

TABLE 10

| 8 | 7 | 6 | 5 | 4 | 3 | 2 | 1 | |
|---|---|---|---|---|---|---|---|---|
| | | 5G NAS security algorithms IEI | | | | | | octet 1 |
| Type of ciphering algorithm | | | | Type of integrity protection algorithm | | | | octet 2 |

TABLE 11

Type of integrity protection algorithm (octet 2, bit 1 to 4)
Bits

| 4 | 3 | 2 | 1 | |
|---|---|---|---|---|
| 0 | 0 | 0 | 0 | 5G integrity algorithm 5G-IA0 (null integrity protection algorithm) |
| 0 | 0 | 0 | 1 | 5G integrity algorithm 128-5G-IA1 |
| 0 | 0 | 1 | 0 | 5G integrity algorithm 128-5G-IA2 |
| 0 | 0 | 1 | 1 | 5G integrity algorithm 128-5G-IA3 |
| 0 | 1 | 0 | 0 | 5G integrity algorithm 5G-IA4 |
| 0 | 1 | 0 | 1 | 5G integrity algorithm 5G-IA5 |
| 0 | 1 | 1 | 0 | 5G integrity algorithm 5G-IA6 |
| 0 | 1 | 1 | 1 | 5G integrity algorithm 5G-IA7 |
| 1 | 0 | 0 | 0 | 5G integrity algorithm 5G-IA8 |
| 1 | 0 | 0 | 1 | 5G integrity algorithm 5G-IA9 |
| 1 | 0 | 1 | 0 | 5G integrity algorithm 5G-IA10 |
| 1 | 0 | 1 | 1 | 5G integrity algorithm 5G-IA11 |
| 1 | 1 | 0 | 0 | 5G integrity algorithm 5G-IA12 |
| 1 | 1 | 0 | 1 | 5G integrity algorithm 5G-IA13 |
| 1 | 1 | 1 | 0 | 5G integrity algorithm 5G-IA14 |
| 1 | 1 | 1 | 1 | 5G integrity algorithm 5G-IA15 |

Type of ciphering algorithm (octet 2, bit 5 to 8)
Bits

| 8 | 7 | 6 | 5 | |
|---|---|---|---|---|
| 0 | 0 | 0 | 0 | 5G encryption algorithm 5G-EA0 (null ciphering algorithm) |
| 0 | 0 | 0 | 1 | 5G encryption algorithm 128-5G-EA1 |
| 0 | 0 | 1 | 0 | 5G encryption algorithm 128-5G-EA2 |
| 0 | 0 | 1 | 1 | 5G encryption algorithm 128-5G-EA3 |
| 0 | 1 | 0 | 0 | 5G encryption algorithm 5G-EA4 |
| 0 | 1 | 0 | 1 | 5G encryption algorithm 5G-EA5 |
| 0 | 1 | 1 | 0 | 5G encryption algorithm 5G-EA6 |
| 0 | 1 | 1 | 1 | 5G encryption algorithm 5G-EA7 |
| 1 | 0 | 0 | 0 | 5G encryption algorithm 5G-EA8 |
| 1 | 0 | 0 | 1 | 5G encryption algorithm 5G-EA9 |
| 1 | 0 | 1 | 0 | 5G encryption algorithm 5G-EA10 |
| 1 | 0 | 1 | 1 | 5G encryption algorithm 5G-EA11 |
| 1 | 1 | 0 | 0 | 5G encryption algorithm 5G-EA12 |
| 1 | 1 | 0 | 1 | 5G encryption algorithm 5G-EA13 |
| 1 | 1 | 1 | 0 | 5G encryption algorithm 5G-EA14 |
| 1 | 1 | 1 | 1 | 5G encryption algorithm 5G-EA15 |

According to an embodiment, the type of security context flag (TSC) and the 5G NAS key set identifier may be configured as shown in the following Table 12. The 5G NAS key set identifier is an identifier used to distinguish the 5G NAS key set and is assigned by the network.

The Type of integrity protection algorithm and the Type of ciphering algorithm are used to represent algorithms used for the ciphering and the integrity protection.

TABLE 12

Type of security context flag (TSC) (octet 7)
Bit

| 4 | |
|---|---|
| 0 | native security context (for $KSI_{AMF}$) |
| 1 | mapped security context (for $KSI_{ASME}$) |

TABLE 12-continued

TSC does not apply for NAS key set identifier value "111".
5G NAS key set identifier (octet 7)
Bits

| 3 | 2 | 1 | |
|---|---|---|---|
| 0 | 0 | 0 | |
| through | | | possible values for the 5G NAS key set identifier |
| 1 | 1 | 0 | |
| 1 | 1 | 1 | no key is available (UE to network); reserved (network to UE) |

According to an embodiment, the type of security context flag (TSC) and the NAS key set identifier may be configured as shown in the following Table 13.

TABLE 13

Type of security context flag (TSC) (octet 7)
Bit

| 5 | |
|---|---|
| 0 | native security context (for $KSI_{AMF}$) |
| 1 | mapped security context (for $KSI_{ASME}$) |

TSC does not apply for 5G NAS key set identifier value "1111".
5G NAS key set identifier (octet 7)
Bits

| 4 | 3 | 2 | 1 | |
|---|---|---|---|---|
| 0 | 0 | 0 | 0 | |
| | through | | | possible values for the 5G NAS key set identifier |
| 1 | 1 | 1 | 0 | |
| 1 | 1 | 1 | 1 | no key is available (UE to network); reserved (network to UE) |

According to an embodiment, the type of security context flag (TSC) and the 5G NAS key set identifier may be configured as shown in the following Table 14.

TABLE 14

Type of security context flag (TSC) (octet 7)
Bit

| 8 | |
|---|---|
| 0 | native security context (for $KSI_{AMF}$) |
| 1 | mapped security context (for $KSI_{ASME}$) |

TSC does not apply for NAS key set identifier value "1111".
5G NAS key set identifier (octet 7)
Bits

| 4 | 3 | 2 | 1 | |
|---|---|---|---|---|
| 0 | 0 | 0 | 0 | |
| | through | | | possible values for the NAS key set identifier |
| 1 | 1 | 1 | 0 | |
| 1 | 1 | 1 | 1 | no key is available (UE to network); reserved (network to UE) |

According to an embodiment, the type of security context flag (TSC) and the 5G NAS key set identifier may be configured as values in the 5G NAS key set identifier information element as shown in the following Table 15.

TABLE 15

| 8 | 7 | 6 | 5 | 4 | 3 | 2 | 1 | |
|---|---|---|---|---|---|---|---|---|
| 5 G NAS key set identifier IEI | | | | TSC | 5 G NAS key set identifier | | | octet 1 |

In the configuration of Table 15, the 5G NAS key set identifier is configured from bits 1 to 3 of octet 1, and the type of security context flag (TSC) is configured at bit 4 of octet 1.

According to an embodiment, the type of security context flag (TSC) and the 5G NAS key set identifier may be configured as shown in the following Table 16. The 5G NAS key set identifier is the identifier used to distinguish the 5G NAS key set and is assigned by the network.

The Type of integrity protection algorithm and the Type of ciphering algorithm are used to represent algorithms used for the ciphering and the integrity protection.

TABLE 16

Type of security context flag (TSC) (octet 1)
Bit

| 4 | | |
|---|---|---|
| 0 | | native security context (for $KSI_{AMF}$) |
| 1 | | mapped security context (for $KSI_{ASME}$) |

TSC does not apply for NAS key set identifier value "111".
5G NAS key set identifier (octet 1)
Bits

| 3 | 2 | 1 | |
|---|---|---|---|
| 0 | 0 | 0 | |
| through | | | possible values for the 5G NAS key set identifier |
| 1 | 1 | 0 | |
| 1 | 1 | 1 | no key is available (UE to network); reserved (network to UE) |

According to an embodiment, the type of security context flag (TSC) and the 5G NAS key set identifier may be configured with values in the 5G NAS key set identifier information element as shown in the following Table 17.

TABLE 17

| 8 | 7 | 6 | 5 | 4 | 3 | 2 | 1 | |
|---|---|---|---|---|---|---|---|---|
| 5 G NAS key set identifier IEI | | | TSC | 5 G NAS key set identifier | | | | octet 1 |

According to an embodiment, the 5G NAS key set identifier is configured from bits 1 to 4 of octet 1, and the type of security context flag (TSC) is configured at bit 5 of octet 1.

According to an embodiment of Table 17, the type of security context flag (TSC) and the NAS key set identifier may be configured as shown in the following Table 18.

TABLE 18

Type of security context flag (TSC) (octet 1)
Bit

| 5 | | |
|---|---|---|
| 0 | | native security context (for $KSI_{AMF}$) |
| 1 | | mapped security context (for $KSI_{ASME}$) |

TSC does not apply for 5G NAS key set identifier value "1111".
5G NAS key set identifier (octet 1)
Bits

| 4 | 3 | 2 | 1 | |
|---|---|---|---|---|
| 0 | 0 | 0 | 0 | |
| through | | | | possible values for the 5G NAS key set identifier |
| 1 | 1 | 1 | 0 | |
| 1 | 1 | 1 | 1 | no key is available (UE to network); reserved (network to UE) |

As an embodiment, the type of security context flag (TSC) and the 5G NAS key set identifier may be configured with values in the 5G NAS key set identifier information element as shown in the following Table 19.

TABLE 19

| 8 | 7 | 6 | 5 | 4 | 3 | 2 | 1 | |
|---|---|---|---|---|---|---|---|---|
| | | | | 5 G NAS key set identifier IEI | | | | octet 1 |
| spare | | | TSC | 5 G NAS key set identifier | | | | octet 2 |

In Table 19, the 5G NAS key set identifier is configured from bits 1 to 4 of octet 2, and the type of security context flag (TSC) is configured at bit 5 of octet 1.

According to an embodiment, the type of security context flag (TSC) and the NAS key set identifier of Table 19 may be configured as shown in the following Table 20.

TABLE 20

Type of security context flag (TSC) (octet 2)
Bit

| 5 | | |
|---|---|---|
| 0 | | native security context (for $KSI_{AMF}$) |
| 1 | | mapped security context (for $KSI_{ASME}$) |

TSC does not apply for SG NAS key set identifier value "1111".
5G NAS key set identifier (octet 2)
Bits

| 4 | 3 | 2 | 1 | |
|---|---|---|---|---|
| 0 | 0 | 0 | 0 | |
| through | | | | possible values for the 5G NAS key set identifier |
| 1 | 1 | 1 | 0 | |
| 1 | 1 | 1 | 1 | no key is available (UE to network); reserved (network to UE) |

As an embodiment, the type of security context flag (TSC) and the 5G NAS key set identifier may be configured with values in the 5G NAS key set identifier information element as shown in the following Table 21.

TABLE 21

| 8 | 7 | 6 | 5 | 4 | 3 | 2 | 1 | |
|---|---|---|---|---|---|---|---|---|
| | | | | 5 G NAS key set identifier IEI | | | | octet 1 |
| TSC | spare | | | 5 G NAS key set identifier | | | | octet 2 |

In Table 21, the 5G NAS key set identifier is configured from bits 1 to 4 of octet 2, and the type of security context flag (TSC) is configured at bit 8 of octet 2.

According to an embodiment, the type of security context flag (TSC) and the 5G NAS key set identifier of Table 21 may be configured as shown in the following Table 22.

TABLE 22

Type of security context flag (TSC) (octet 2)
Bit

| 8 | | |
|---|---|---|
| 0 | | native security context (for $KSI_{AMF}$) |
| 1 | | mapped security context (for $KSI_{ASME}$) |

TSC does not apply for NAS key set identifier value "1111".
5G NAS key set identifier (octet 2)
Bits

| 4 | 3 | 2 | 1 | |
|---|---|---|---|---|
| 0 | 0 | 0 | 0 | |
| through | | | | possible values for the NAS key set identifier |
| 1 | 1 | 1 | 0 | |

TABLE 22-continued

| 1 | 1 | 1 | 1 | no key is available (UE to network); reserved (network to UE) |

Meanwhile, if the UE hands over from the 5G to the EUTRAN, the following information is transmitted in the transparent container. That is, the NAS security parameters from NG-RAN information elements are configured as shown in the following Table 23.

TABLE 23

| 8 | 7 | 6 | 5 | 4 | 3 | 2 | 1 | |
|---|---|---|---|---|---|---|---|---|
| NAS security parameters from NG-RAN IEI | | | | | | | | octet 1 |
| 0 | 0 | 0 | 0 | DL NAS COUNT value (short) | | | | octet 2 |
| Spare | | | | | | | | |

In Table 23, the DL NAS COUNT value (short) is configured from bits 1 to 4 of octet 2, and 4 least significant bits (LSBs) of the binary representation of the downlink NAS COUNT value applied to transmit this information element are utilized in this field.

Bits 5 through 8 are set to zero (0) as spare.

This parameter is the value included in the transparent container if the UE hands over from the 5G to the EUTRAN.

Figure 3:
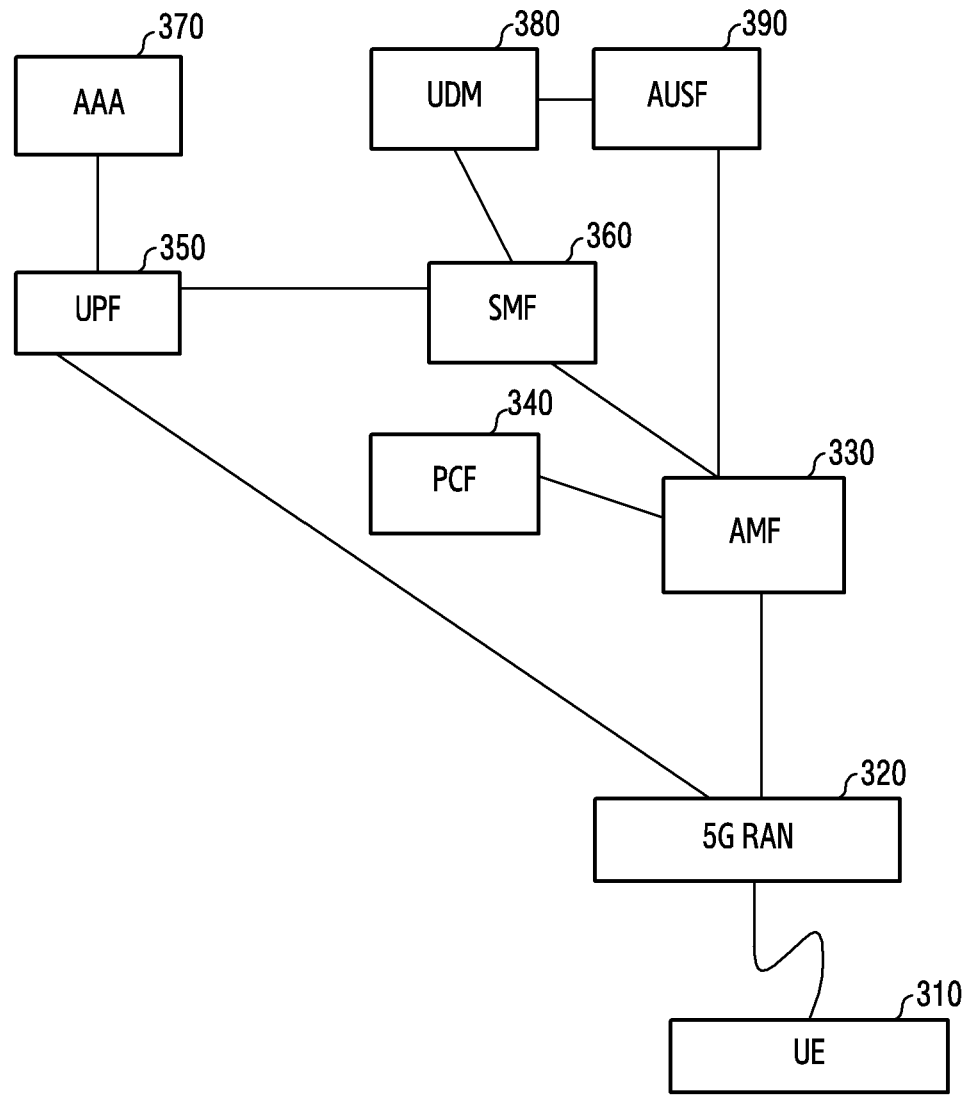
FIG. 3 illustrates an example of a network environment for a security procedure in a 5G network according to an embodiment.

FIG. 3 illustrates an example of a network environment for a security procedure of a UE in a 5G network according to an embodiment.

Referring to FIG. 3, a 5G network according to an embodiment may include, for example, a UPF 350, an SMF 360, an AMF 330, a 5G RAN 320, a UDM 380, and a PCF 340. In addition, an AUSF 390 and an AAA 370 may be further included for authentication of these entities.

While the communication network applied in the present embodiment assumes the 5G network, it may be applied to other system if the same concept is applied within a scope understood by those having ordinary skill in the art.

Figure 4:
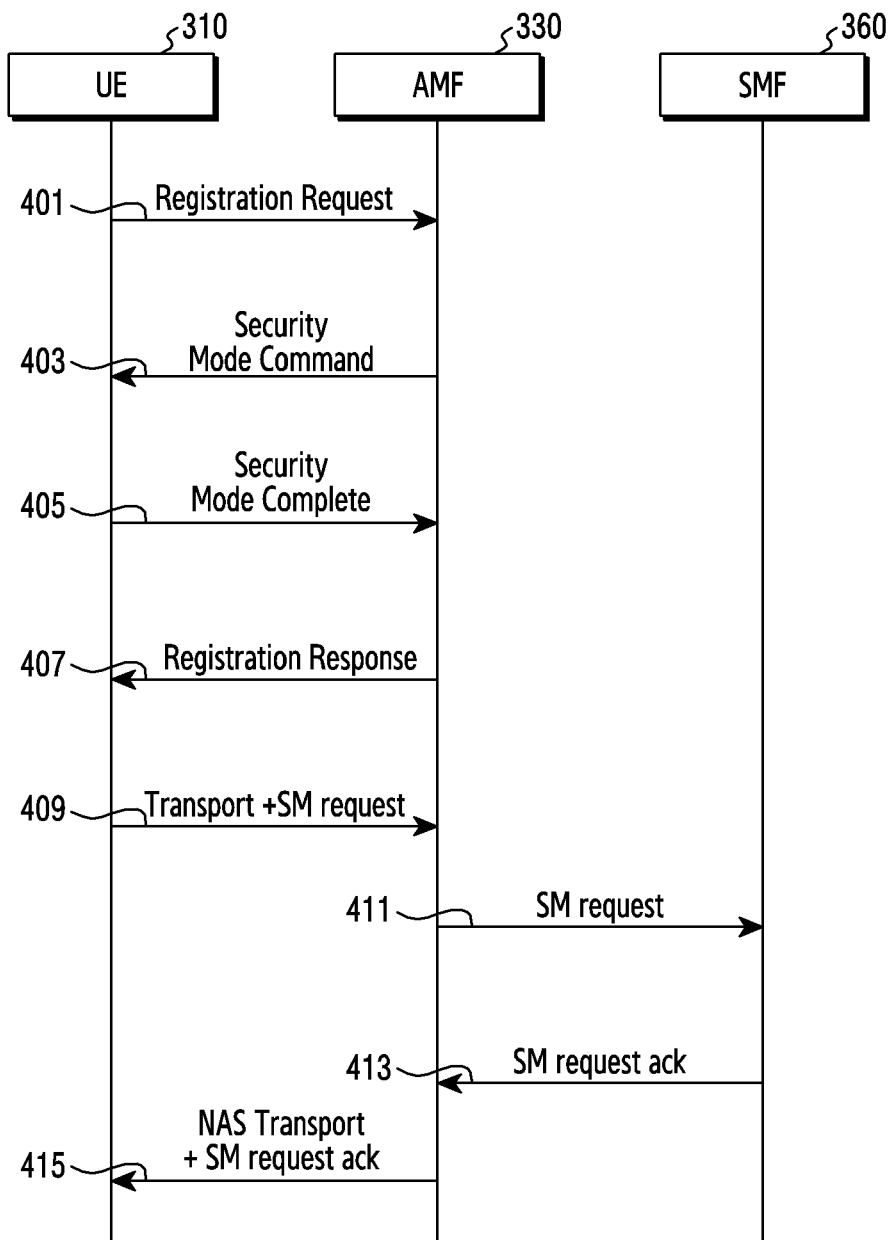
FIG. 4 illustrates an example for supporting security in data transmission in a 5G network according to an embodiment.

FIG. 4 illustrates an example for supporting security in data transmission in a 5G network according to an embodiment.

In step 401 and step 407, a registration request of a UE 310 is transmitted to an AMF 330 and a registration response is received from the AMF 330 to the UE 310. A session of the UE is established in steps 409, 411, 413, and 415. Meanwhile, for security protection, a security mode command is transmitted from the AMF 330 to the UE 310 in step 403, and the UE 310 transmits a security mode complete message to the AMF 330 in step 405, thus transmitting and verifying security related information such as algorithms for integrity protection and ciphering.

A format of the security mode command message according to an embodiment is shown in the following Table 24.

TABLE 24

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | Security mode command Message identity | Message type | M | V | 1 |
| | Selected NAS security algorithms | NAS security algorithms | M | | |
| | 5G NAS key set identifier | 5G NAS key set identifier | M | | |
| | Replayed UE security capability | UE security capability | M | | |
| | Allowed NSSAI | NSSAI | O | | |
| | Mapping of Allowed NSSAI | | O | | |
| | Replayed Nonce$_{UE}$ | Nonce | O | | |
| | Nonce$_{AMF}$ | Nonce | O | | |
| | Hash$_{AMF}$ | Hash | O | | |

Even if the AMF 330 transmits mapping of allowed NSSAI to the UE 310 and the UE roams, the UE may transmit information about which NSSAI the NSSAI allowed to use in the VPLMN is mapped to in the home PLMN.

The format of the Security mode complete message according to an embodiment may be configured as shown in the following Table 25.

TABLE 25

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |

TABLE 25-continued

| IEI | Information Element | Type/Reference | Presence | Format | Length |
|---|---|---|---|---|---|
| | Security mode complete Message identity | Message type | M | V | 1 |
| | Replayed NAS message container | Replayed NAS message container | O | TLV-E | 3-n |

Meanwhile, UE security capability IE may include 5G encryption, integrity algorithm, and EPS algorithm used in the eUTRAN as shown in Table 26 and/or 27.

According to another embodiment, the UE security capability IE may include 5G encryption, integrity algorithm, and EPS algorithm used in the eUTRAN as shown in Tables 28 and 29.

TABLE 26

| 8 | 7 | 6 | 5 | 4 | 3 | 2 | 1 | |
|---|---|---|---|---|---|---|---|---|
| UE security capability IEI | | | | | | | | octet 1 |
| Length of UE security capability contents | | | | | | | | octet 2 |
| 5G-EA0 | 128-5G-EA1 | 128-5G-EA2 | 128-5G-EA3 | 5G-EA4 | 5G-EA5 | 5G-EA6 | 5G-EA7 | octet 3 |
| 5G-EA8 | 5G-EA9 | 5G-EA10 | 5G-EA11 | 5G-EA12 | 5G-EA13 | 5G-EA14 | 5G-EA15 | octet 4 |
| 5G-IA0 | 128-5G-IA1 | 128-5G-IA2 | 128-5G-IA3 | 5G-IA4 | 5G-IA5 | 5G-IA6 | 5G-IA7 | octet 5 |
| 5G-IA8 | 5G-IA9 | 5G-IA10 | 5G-IA11 | 5G-IA12 | 5G-IA13 | 5G-IA14 | 5G-IA15 | octet 6 |
| EEA0 | 128-EEA1 | 128-EEA2 | 128-EEA3 | EEA4 | EEA5 | EEA6 | EEA7 | octet 7 |
| ETA0 | 128-EIA1 | 128-EIA2 | 128-EIA3 | EIA4 | EIA5 | EIA6 | EIA7 | octet 8 |

TABLE 27

| 5GS encryption algorithms supported (octet 3) (NOTE 1) 5GS encryption algorithm 5G-EA0 supported (octet 3, bit 8) |
|---|
| 0   5GS encryption algorithm 5G-EA0 not supported<br>1   5GS encryption algorithm 5G-EA0 supported |
| 5GS encryption algorithm 128-5G-EA1 supported (octet 3, bit 7) |
| 0   5GS encryption algorithm 128-5G-EA1 not supported<br>1   5GS encryption algorithm 128-5G-EA1 supported<br>5GS encryption algorithm 128-5G-EA2 supported (octet 3, bit 6) |
| 0   5GS encryption algorithm 128-5G-EA2 not supported<br>1   5GS encryption algorithm 128-5G-EA2 supported<br>5GS encryption algorithm 128-5G-EA3 supported (octet 3, bit 5) |
| 0   5GS encryption algorithm 128-5G-EA3 not supported<br>1   5GS encryption algorithm 128-5G-EA3 supported<br>5GS encryption algorithm 5G-EA4 supported (octet 3, bit 4) |
| 0   5GS encryption algorithm 5G-EA4 not supported<br>1   5GS encryption algorithm 5G-EA4 supported |
| 5GS encryption algorithm 5G-EA5 supported (octet 3, bit 3) |
| 0   5GS encryption algorithm 5G-EA5 not supported<br>1   5GS encryption algorithm 5G-EA5 supported |
| 5GS encryption algorithm 5G-EA6 supported (octet 3, bit 2) |
| 0   5GS encryption algorithm 5G-EA6 not supported<br>1   5GS encryption algorithm 5G-EA6 supported |

TABLE 27-continued

| 5GS encryption algorithm 5G-EA7 supported (octet 3, bit 1) |
|---|
| 0   5GS encryption algorithm 5G-EA7 not supported<br>1   5GS encryption algorithm 5G-EA7 supported |
| 5GS encryption algorithms supported (octet 4)<br>5GS encryption algorithm 5G-EA8 supported (octet 4, bit 8) |
| 0   5GS encryption algorithm 5G-EA8 not supported<br>1   5GS encryption algorithm 5G-EA8 supported |
| 5GS encryption algorithm 5G-EA9 supported (octet 4, bit 7) |
| 0   5GS encryption algorithm 5G-EA9 not supported<br>1   5GS encryption algorithm 5G-EA9 supported |
| 5GS encryption algorithm 5G-EA10 supported (octet 4, bit 6) |
| 0   5GS encryption algorithm 5G-EA10 not supported<br>1   5GS encryption algorithm 5G-EA10 supported |
| 5GS encryption algorithm 5G-EA11 supported (octet 4, bit 5) |
| 0   5GS encryption algorithm 5G-EA11 not supported<br>1   5GS encryption algorithm 5G-EA11 supported<br>5GS encryption algorithm 5G-EA12 supported (octet 4, bit 4) |
| 0   5GS encryption algorithm 5G-EA12 not supported<br>1   5GS encryption algorithm 5G-EA12 supported |
| 5GS encryption algorithm 5G-EA13 supported (octet 4, bit 3) |
| 0   5GS encryption algorithm 5G-EA13 not supported<br>1   5GS encryption algorithm 5G-EA13 supported |
| 5GS encryption algorithm 5G-EA14 supported (octet 4, bit 2) |
| 0   5GS encryption algorithm 5G-EA14 not supported<br>1   5GS encryption algorithm 5G-EA14 supported |
| 5GS encryption algorithm 5G-EA15 supported (octet 4, bit 1) |
| 0   5GS encryption algorithm 5G-EA15 not supported<br>1   5GS encryption algorithm 5G-EA15 supported |
| 5GS integrity algorithms supported (octet 5) (NOTE 2)<br>5GS integrity algorithm 5G-IA0 supported (octet 5, bit 8) |
| 0   5GS integrity algorithm 5G-IA0 not supported<br>1   5GS integrity algorithm 5G-IA0 supported |
| 5GS integrity algorithm 128-5G-IA1 supported (octet 5, bit 7) |
| 0   5GS integrity algorithm 128-5G-IA1 not supported<br>1   5GS integrity algorithm 128-5G-IA1 supported |
| 5GS integrity algorithm 128-5G-IA2 supported (octet 5, bit 6) |
| 0   5GS integrity algorithm 128-5G-IA2 not supported<br>1   5GS integrity algorithm 128-5G-IA2 supported |
| 5GS integrity algorithm 128-5G-IA3 supported (octet 5, bit 5) |
| 0   5GS integrity algorithm 128-5G-IA3 not supported<br>1   5GS integrity algorithm 128-5G-IA3 supported |

TABLE 27-continued

| | |
|---|---|
| 5GS integrity algorithm 5G-IA4 supported (octet 5, bit 4) | |
| 0 | 5GS integrity algorithm 5G-IA4 not supported |
| 1 | 5GS integrity algorithm 5G-IA4 supported |
| 5GS integrity algorithm 5G-IA5 supported (octet 5, bit 3) | |
| 0 | 5GS integrity algorithm 5G-IA5 not supported |
| 1 | 5GS integrity algorithm 5G-IA5 supported |
| 5GS integrity algorithm 5G-IA6 supported (octet 5, bit 2) | |
| 0 | 5GS integrity algorithm 5G-IA6 not supported |
| 1 | 5GS integrity algorithm 5G-IA6 supported |
| 5GS integrity algorithm 5G-IA7 supported (octet 5, bit 1) | |
| 0 | 5GS integrity algorithm 5G-IA7 not supported |
| 1 | 5GS integrity algorithm 5G-IA7 supported |
| 5GS integrity algorithms supported (octet 6) 5GS integrity algorithm 5G-IA8 supported (octet 6, bit 8) | |
| 0 | 5GS integrity algorithm 5G-IA8 not supported |
| 1 | 5GS integrity algorithm 5G-IA8 supported |
| 5GS integrity algorithm 5G-IA9 supported (octet 6, bit 7) | |
| 0 | 5GS integrity algorithm 5G-IA9 not supported |
| 1 | 5GS integrity algorithm 5G-IA9 supported |
| 5GS integrity algorithm 5G-IA10 supported (octet 6, bit 6) | |
| 0 | 5GS integrity algorithm 5G-IA10 not supported |
| 1 | 5GS integrity algorithm 5G-IA10 supported |
| 5GS integrity algorithm 5G-IA11 supported (octet 6, bit 5) | |
| 0 | 5GS integrity algorithm 5G-IA11 not supported |
| 1 | 5GS integrity algorithm 5G-IA11 supported |
| 5GS integrity algorithm 5G-IA12 supported (octet 6, bit 4) | |
| 0 | 5GS integrity algorithm 5G-IA12 not supported |
| 1 | 5GS integrity algorithm 5G-IA12 supported |
| 5GS integrity algorithm 5G-IA13 supported (octet 6, bit 3) | |
| 0 | 5GS integrity algorithm 5G-IA13 not supported |
| 1 | 5GS integrity algorithm 5G-IA13 supported |
| 5GS integrity algorithm 5G-IA14 supported (octet 6, bit 2) | |
| 0 | 5GS integrity algorithm 5G-IA14 not supported |
| 1 | 5GS integrity algorithm 5G-IA14 supported |
| 5GS integrity algorithm 5G-IA15 supported (octet 6, bit 1) | |
| 0 | 5GS integrity algorithm 5G-IA15 not supported |
| 1 | 5GS integrity algorithm 5G-IA15 supported |
| EPS encryption algorithms supported (octet 7) EPS encryption algorithm EEA0 supported (octet 7, bit 8) | |
| 0 | EPS encryption algorithm EEA0 not supported |
| 1 | EPS encryption algorithm EEA0 supported |
| EPS encryption algorithm 128-EEA1 supported (octet 7, bit 7) | |
| 0 | EPS encryption algorithm 128-EEA1 not supported |
| 1 | EPS encryption algorithm 128-EEA1 supported |
| EPS encryption algorithm 128-EEA2 supported (octet 7, bit 6) | |
| 0 | EPS encryption algorithm 128-EEA2 not supported |
| 1 | EPS encryption algorithm 128-EEA2 supported |
| EPS encryption algorithm 128-EEA3 supported (octet 7, bit 5) | |
| 0 | EPS encryption algorithm 128-EEA3 not supported |
| 1 | EPS encryption algorithm 128-EEA3 supported |
| EPS encryption algorithm EEA4 supported (octet 7, bit 4) | |
| 0 | EPS encryption algorithm EEA4 not supported |
| 1 | EPS encryption algorithm EEA4 supported |
| EPS encryption algorithm EEA5 supported (octet 7, bit 3) | |
| 0 | EPS encryption algorithm EEA5 not supported |
| 1 | EPS encryption algorithm EEA5 supported |
| EPS encryption algorithm EEA6 supported (octet 7, bit 2) | |
| 0 | EPS encryption algorithm EEA6 not supported |
| 1 | EPS encryption algorithm EEA6 supported |
| EPS encryption algorithm EEA7 supported (octet 7, bit 1) | |
| 0 | EPS encryption algorithm EEA7 not supported |
| 1 | EPS encryption algorithm EEA7 supported |
| EPS integrity algorithms supported (octet 8) EPS integrity algorithm EIA0 supported (octet 8, bit 8) | |
| 0 | EPS integrity algorithm EIA0 not supported |
| 1 | EPS integrity algorithm EIA0 supported |
| EPS integrity algorithm 128-EIA1 supported (octet 8, bit 7) | |
| 0 | EPS integrity algorithm 128-EIA1 not supported |
| 1 | EPS integrity algorithm 128-EIA1 supported |
| EPS integrity algorithm 128-EIA2 supported (octet 8, bit 6) | |
| 0 | EPS integrity algorithm 128-EIA2 not supported |
| 1 | EPS integrity algorithm 128-EIA2 supported |
| EPS integrity algorithm 128-EIA3 supported (octet 8, bit 5) | |
| 0 | EPS integrity algorithm 128-EIA3 not supported |
| 1 | EPS integrity algorithm 128-EIA3 supported |
| EPS integrity algorithm EIA4 supported (octet 8, bit 4) | |
| 0 | EPS integrity algorithm EIA4 not supported |
| 1 | EPS integrity algorithm EIA4 supported |
| EPS integrity algorithm EIA5 supported (octet 8, bit 3) | |
| 0 | EPS integrity algorithm EIA5 not supported |
| 1 | EPS integrity algorithm EIA5 supported |
| EPS integrity algorithm EIA6 supported (octet 8, bit 2) | |
| 0 | EPS integrity algorithm EIA6 not supported |
| 1 | EPS integrity algorithm EIA6 supported |
| EPS integrity algorithm EIA7 supported (octet 8, bit 1) | |
| 0 | EPS integrity algorithm EIA7 not supported |
| 1 | EPS integrity algorithm EIA7 supported |

TABLE 28

| 8 | 7 | 6 | 5 | 4 | 3 | 2 | 1 | |
|---|---|---|---|---|---|---|---|---|
| UE security capability IEI | | | | | | | | octet 1 |
| Length of UE security capability contents | | | | | | | | octet 2 |
| 5G-EA0 | 128-5G-EA1 | 128-5G-EA2 | 128-5G-EA3 | 5G-EA4 | 5G-EA5 | 5G-EA6 | 5G-EA7 | octet 3 |

TABLE 28-continued

| 8 | 7 | 6 | 5 | 4 | 3 | 2 | 1 | |
|---|---|---|---|---|---|---|---|---|
| 5 G-IA0 | 128-5 G-IA1 | 12 5 G-IA2 | 128-5 G-IA3 | 5 G-IA4 | 5 G-IA5 | 5 G-IA6 | 5 G-IA7 | octet 4 |
| EEA0 | 128-EEA1 | 128-EEA2 | 128-EEA3 | EEA4 | EEA5 | EEA6 | EEA7 | octet 5 |
| EIA0 | 128-EIA1 | 128-EIA2 | 128-EIA3 | EIA4 | EIA5 | EIA6 | EIA7 | octet 6 |

TABLE 29

| | 5GS encryption algorithms supported (octet 3) (NOTE 1) |
|---|---|
| | 5GS encryption algorithm 5G-EA0 supported (octet 3, bit 8) |
| 0 | 5GS encryption algorithm 5G-EA0 not supported |
| 1 | 5GS encryption algorithm 5G-EA0 supported |
| | 5GS encryption algorithm 128-5G-EA1 supported (octet 3, bit 7) |
| 0 | 5GS encryption algorithm 128-5G-EA1 not supported |
| 1 | 5GS encryption algorithm 128-5G-EA1 supported |
| | 5GS encryption algorithm 128-5G-EA1 supported (octet 3, bit 6) |
| 0 | 5GS encryption algorithm 128-5G-EA2 not supported |
| 1 | 5GS encryption algorithm 128-5G-EA2 supported |
| | 5GS encryption algorithm 128-5G-EA3 supported (octet 3, bit 5) |
| 0 | 5GS encryption algorithm 128-5G-EA3 not supported |
| 1 | 5GS encryption algorithm 128-5G-EA3 supported |
| | 5GS encryption algorithm 5G-EA4 supported (octet 3, bit 4) |
| 0 | 5GS encryption algorithm 5G-EA4 not supported |
| 1 | 5GS encryption algorithm 5G-EA4 supported |
| | 5GS encryption algorithm 5G-EA5 supported (octet 3, bit 3) |
| 0 | 5GS encryption algorithm 5G-EA5 not supported |
| 1 | 5GS encryption algorithm 5G-EA5 supported |
| | 5GS encryption algorithm 5G-EA6 supported (octet 3, bit 2) |
| 0 | 5GS encryption algorithm 5G-EA6 not supported |
| 1 | 5GS encryption algorithm 5G-EA6 supported |
| | 5GS encryption algorithm 5G-EA7 supported (octet 3, bit 1) |
| 0 | 5GS encryption algorithm 5G-EA7 not supported |
| 1 | 5GS encryption algorithm 5G-EA7 supported |
| | 5GS integrity algorithms supported (octet 4) |
| | 5GS integrity algorithm 5G-IA0 supported (octet 4, bit 8) |
| 0 | 5GS integrity algorithm 5G-IA0 not supported |
| 1 | 5GS integrity algorithm 5G-IA0 supported |
| | 5GS integrity algorithm 128-5G-IA1 supported (octet 4, bit 7) |
| 0 | 5GS integrity algorithm 128-5G-IA1 not supported |
| 1 | 5GS integrity algorithm 128-5G-IA1 supported |
| | 5GS integrity algorithm 128-5G-IA2 supported (octet 4, bit 6) |
| 0 | 5GS integrity algorithm 128-5G-IA2 not supported |
| 1 | 5GS integrity algorithm 128-5G-IA2 supported |
| | 5GS integrity algorithm 128-5G-IA3 supported (octet 4, bit 5) |
| 0 | 5GS integrity algorithm 128-5G-IA3 not supported |
| 1 | 5GS integrity algorithm 128-5G-IA3 supported |
| | 5GS integrity algorithm 5G-IA4 supported (octet 4, bit 4) |
| 0 | 5GS integrity algorithm 5G-IA4 not supported |
| 1 | 5GS integrity algorithm 5G-IA4 supported |
| | 5GS integrity algorithm 5G-IA5 supported (octet 4, bit 3) |
| 0 | SGS integrity algorithm 5G-IA5 not supported |
| 1 | SGS integrity algorithm 5G-IA5 supported |
| | 5GS integrity algorithm 5G-IA6 supported (octet 4, bit 2) |
| 0 | SGS integrity algorithm 5G-IA6 not supported |
| 1 | SGS integrity algorithm 5G-IA6 supported |
| | 5GS integrity algorithm 5G-IA7 supported (octet 4, bit 1) |
| 0 | SGS integrity algorithm 5G-IA7 not supported |
| 1 | SGS integrity algorithm 5G-IA7 supported |
| | EPS encryption algorithms supported (octet 5) |
| | EPS encryption algorithm EEA0 supported (octet 5, bit 8) |
| 0 | EPS encryption algorithm EEA0 not supported |
| 1 | EPS encryption algorithm EEA0 supported |
| | EPS encryption algorithm 128-EEA1 supported (octet 5, bit 7) |
| 0 | EPS encryption algorithm 128-EEA1 not supported |
| 1 | EPS encryption algorithm 128-EEA1 supported |
| | EPS encryption algorithm 128-EEA2 supported (octet 5, bit 6) |
| 0 | EPS encryption algorithm 128-EEA2 not supported |
| 1 | EPS encryption algorithm 128-EEA2 supported |

TABLE 29-continued

| | EPS encryption algorithm 128-EEA3 supported (octet 5, bit 5) |
|---|---|
| 0 | EPS encryption algorithm 128-EEA3 not supported |
| 1 | EPS encryption algorithm 128-EEA3 supported |
| | EPS encryption algorithm EEA4 supported (octet 5, bit 4) |
| 0 | EPS encryption algorithm EEA4 not supported |
| 1 | EPS encryption algorithm EEA4 supported |
| | EPS encryption algorithm EEA5 supported (octet 5, bit 3) |
| 0 | EPS encryption algorithm EEA5 not supported |
| 1 | EPS encryption algorithm EEA5 supported |
| | EPS encryption algorithm EEA6 supported (octet 5, bit 2) |
| 0 | EPS encryption algorithm EEA6 not supported |
| 1 | EPS encryption algorithm EEA6 supported |
| | EPS encryption algorithm EEA7 supported (octet 5, bit 1) |
| 0 | EPS encryption algorithm EEA7 not supported |
| 1 | EPS encryption algorithm EEA7 supported |
| | EPS integrity algorithms supported (octet 6) |
| | EPS integrity algorithm EIA0 supported (octet 6, bit 8) |
| 0 | EPS integrity algorithm EIA0 not supported |
| 1 | EPS integrity algorithm EIA0 supported |
| | EPS integrity algorithm 128-EIA1 supported (octet 6, bit 7) |
| 0 | EPS integrity algorithm 128-EIA1 not supported |
| 1 | EPS integrity algorithm 128-EIA1 supported |
| | EPS integrity algorithm 128-EIA2 supported (octet 6, bit 6) |
| 0 | EPS integrity algorithm 128-EIA2 not supported |
| 1 | EPS integrity algorithm 128-EIA2 supported |
| | EPS integrity algorithm 128-EIA3 supported (octet 6, bit 5) |
| 0 | EPS integrity algorithm 128-EIA3 not supported |
| 1 | EPS integrity algorithm 128-EIA3 supported |
| | EPS integrity algorithm EIA4 supported (octet 6, bit 4) |
| 0 | EPS integrity algorithm EIA4 not supported |
| 1 | EPS integrity algorithm EIA4 supported |
| | EPS integrity algorithm EIA5 supported (octet 6, bit 3) |
| 0 | EPS integrity algorithm EIA5 not supported |
| 1 | EPS integrity algorithm EIA5 supported |
| | EPS integrity algorithm EIA6 supported (octet 6, bit 2) |
| 0 | EPS integrity algorithm EIA6 not supported |
| 1 | EPS integrity algorithm EIA6 supported |
| | EPS integrity algorithm EIA7 supported (octet 6, bit 1) |
| 0 | EPS integrity algorithm EIA7 not supported |
| 1 | EPS integrity algorithm EIA7 supported |

According to an embodiment, the 5G NAS security algorithms information element may be configured as type of ciphering algorithm and type of integrity protection algorithm of the 5G NAS security algorithms information element of the following Table 30. Herein, the configuration of the above values may be configured as shown in Table 31.

TABLE 30

| 8 | 7 | 6 | 5 | 4 | 3 | 2 | 1 | |
|---|---|---|---|---|---|---|---|---|
| | | | 5 G NAS security algorthms IEI | | | | | octet 1 |
| 0 spare | Type of ciphering algorithm | | | 0 spare | Type of integrity protection algorithm | | | octet 2 |

TABLE 31

Type of integrity protection algorithm (octet 2, bit 1 to 3)

Bits

| 3 | 2 | 1 | |
|---|---|---|---|
| 0 | 0 | 0 | 5G integrity algorithm 5G-IA0 (null integrity protection algorithm) |
| 0 | 0 | 1 | 5G integrity algorithm 128-5G-IA1 |
| 0 | 1 | 0 | 5G integrity algorithm 128-5G-IA2 |
| 0 | 1 | 1 | 5G integrity algorithm 128-5G-IA3 |
| 1 | 0 | 0 | 5G integrity algorithm 5G-IA4 |
| 1 | 0 | 1 | 5G integrity algorithm 5G-IA5 |

TABLE 31-continued

| | | | |
|---|---|---|---|
| 1 | 1 | 0 | 5G integrity algorithm 5G-IA6 |
| 1 | 1 | 1 | 5G integrity algorithm 5G-IA7 |

Type of ciphering algorithm (octet 2, bit 5 to 7)

Bits

| 7 | 6 | 5 | |
|---|---|---|---|
| 0 | 0 | 0 | 5G encryption algorithm 5G-EA0 (null ciphering algorithm) |
| 0 | 0 | 1 | 5G encryption algorithm 128-5G-EA1 |
| 0 | 1 | 0 | 5G encryption algorithm 128-5G-EA2 |
| 0 | 1 | 1 | 5G encryption algorithm 128-5G-EA3 |
| 1 | 0 | 0 | 5G encryption algorithm 5G-EA4 |
| 1 | 0 | 1 | 5G encryption algorithm 5G-EA5 |
| 1 | 1 | 0 | 5G encryption algorithm 5G-EA6 |
| 1 | 1 | 1 | 5G encryption algorithm 5G-EA7 |

Bit 4 and 8 of octet 2 are spare and shall be coded as zero.

According to an embodiment, the 5G NAS security algorithms information element may be configured as type of ciphering algorithm and type of integrity protection algorithm of the 5G NAS security algorithms information element of the following Table 32. The configuration of the values is shown in Table 33. The Type of integrity protection algorithm and the type of ciphering algorithm are used to represent algorithms used for ciphering and integrity protection.

TABLE 32

| 8 | 7 | 6 | 5 | 4 | 3 | 2 | 1 | |
|---|---|---|---|---|---|---|---|---|
| 5 G NAS security algorthms IEI | | | | | | | | octet 1 |
| Type of ciphering algorithm | | | | Type of integrity protection algorithm | | | | octet 2 |

TABLE 33

Type of integrity protection algorithm (octet 2, bit 1 to 4)

Bits

| 4 | 3 | 2 | 1 | |
|---|---|---|---|---|
| 0 | 0 | 0 | 0 | 5G integrity algorithm 5G-IA0 (null integrity protection algorithm) |
| 0 | 0 | 0 | 1 | 5G integrity algorithm 128-5G-IA1 |
| 0 | 0 | 1 | 0 | 5G integrity algorithm 128-5G-IA2 |
| 0 | 0 | 1 | 1 | 5G integrity algorithm 128-5G-IA3 |
| 0 | 1 | 0 | 0 | 5G integrity algorithm 5G-IA4 |
| 0 | 1 | 0 | 1 | 5G integrity algorithm 5G-IA5 |
| 0 | 1 | 1 | 0 | 5G integrity algorithm 5G-IA6 |
| 0 | 1 | 1 | 1 | 5G integrity algorithm 5G-IA7 |
| 1 | 0 | 0 | 0 | 5G integrity algorithm 5G-IA8 |
| 1 | 0 | 0 | 1 | 5G integrity algorithm 5G-IA9 |
| 1 | 0 | 1 | 0 | 5G integrity algorithm 5G-IA10 |
| 1 | 0 | 1 | 1 | 5G integrity algorithm 5G-IA11 |
| 1 | 1 | 0 | 0 | 5G integrity algorithm 5G-IA12 |
| 1 | 1 | 0 | 1 | 5G integrity algorithm 5G-IA13 |
| 1 | 1 | 1 | 0 | 5G integrity algorithm 5G-IA14 |
| 1 | 1 | 1 | 1 | 5G integrity algorithm 5G-IA15 |

Type of ciphering algorithm (octet 2, bit 5 to 8)

Bits

| 8 | 7 | 6 | 5 | |
|---|---|---|---|---|
| 0 | 0 | 0 | 0 | 5G encryption algorithm SG-EA0 (null ciphering algorithm) |
| 0 | 0 | 0 | 1 | 5G encryption algorithm 128-5G-EA1 |
| 0 | 0 | 1 | 0 | 5G encryption algorithm 128-5G-EA2 |
| 0 | 0 | 1 | 1 | 5G encryption algorithm 128-5G-EA3 |
| 0 | 1 | 0 | 0 | 5G encryption algorithm 5G-EA4 |
| 0 | 1 | 0 | 1 | 5G encryption algorithm 5G-EA5 |
| 0 | 1 | 1 | 0 | 5G encryption algorithm 5G-EA6 |
| 0 | 1 | 1 | 1 | 5G encryption algorithm 5G-EA7 |
| 1 | 0 | 0 | 0 | 5G encryption algorithm 5G-EA8 |
| 1 | 0 | 0 | 1 | 5G encryption algorithm 5G-EA9 |
| 1 | 0 | 1 | 0 | 5G encryption algorithm 5G-EA10 |
| 1 | 0 | 1 | 1 | 5G encryption algorithm 5G-EA11 |
| 1 | 1 | 0 | 0 | 5G encryption algorithm 5G-EA12 |
| 1 | 1 | 0 | 1 | 5G encryption algorithm 5G-EA13 |
| 1 | 1 | 1 | 0 | 5G encryption algorithm 5G-EA14 |
| 1 | 1 | 1 | 1 | 5G encryption algorithm 5G-EA15 |

As an embodiment, the 5G NAS key set identifier information element may be configured as shown in the following Table 34.

TABLE 34

| 8 | 7 | 6 | 5 | 4 | 3 | 2 | 1 | |
|---|---|---|---|---|---|---|---|---|
| 5 G NAS key set identifier IEI | | | | TSC | 5 G NAS key set identifier | | | octet 1 |

The 5G NAS key set identifier is configured at bits 1 to 3 of octet 1 and the type of security context flag (TSC) is configured at bit 4 of octet 1.

In the configuration as shown in Table 34, according to an embodiment, the type of the security context flag (TSC) and the 5G NAS key set identifier may be configured as shown in the following Table 35. The 5G NAS key set identifier is the identifier used to distinguish the 5G NAS key set and is assigned by the network.

Type of integrity protection algorithm and type of ciphering algorithm are used to represent algorithms used for the ciphering and the integrity protection.

TABLE 35

Type of security context flag (TSC) (octet 1)

Bit

| 4 | |
|---|---|
| 0 | native security context (for $KSI_{AMF}$) |
| 1 | mapped security context (for $KSI_{ASME}$) |

TSC does not apply for NAS key set identifier value "111".

5G NAS key set identifier (octet 1)

Bits

| 3 | 2 | 1 | |
|---|---|---|---|
| 0 | 0 | 0 | |
| through | | | possible values for the 5G NAS key set identifier |
| 1 | 1 | 0 | |
| 1 | 1 | 1 | no key is available (UE to network); reserved (network to UE) |

As an embodiment, the 5G NAS key set identifier information element may be configured as shown in the following Table 36.

TABLE 36

| 8 | 7 | 6 | 5 | 4 | 3 | 2 | 1 | |
|---|---|---|---|---|---|---|---|---|
| 5 G NAS key set identifier IEI | | | | TSC | 5 G NAS key set identifier | | | octet 1 |

As an embodiment, the 5G NAS key set identifier is configured at bits 1 to 4 of octet 1, and the type of security context flag (TSC) is configured at bit 5 of octet 1.

According to an embodiment, the type of security context flags (TSC) and the NAS key set identifier in Table 36 may be configured as shown in the following Table 37.

TABLE 37

Type of security context flag (TSC) (octet 1)

Bit 5
0    native security context (for $KSI_{AMF}$)
1    mapped security context (for $KSI_{ASME}$)
TSC does not apply for 5G NAS key set identifier value "1111".

5G NAS key set identifier (octet 1)

Bits 4  3  2  1

0  0  0  0
through    possible values for the 5G NAS key set identifier
1  1  1  0
1  1  1  1  no key is available (UE to network);
                reserved (network to UE)

As an embodiment, 5G NAS key set identifier information element may be constructed as shown in the following Table 38.

TABLE 38

| 8 | 7 | 6 | 5 | 4 | 3 | 2 | 1 | |
|---|---|---|---|---|---|---|---|---|
| | | 5 G NAS key set identifier IEI | | | | | | octet 1 |
| | spare | | TSC | 5 G NAS key set identifier | | | | octet 2 |

The 5G NAS key set identifier is configured at bits 1 to 4 of octet 2 and the type of security context flag (TSC) is configured at bit 5 of octet 1.

According to an embodiment, the type of security context flag (TSC) and the NAS key set identifier in Table 38 may be configured as shown in the following Table 39.

TABLE 39

Type of security context flag (TSC) (octet 2)

Bit 5
0    native security context (for $KSI_{AMF}$)
1    mapped security context (for $KSI_{ASME}$)
TSC does not apply for 5G NAS key set identifier value "1111".

5G NAS key set identifier (octet 2)

Bits 4  3  2  1

0  0  0  0
through    possible values for the 5G NAS key set identifier
1  1  1  0
1  1  1  1  no key is available (UE to network);
                reserved (network to UE)

As an embodiment, the 5G NAS key set identifier information element may be configured as shown in the following Table 40.

TABLE 40

| 8 | 7 | 6 | 5 | 4 | 3 | 2 | 1 | |
|---|---|---|---|---|---|---|---|---|
| | | 5 G NAS key set identifier IEI | | | | | | octet 1 |
| TSC | | spare | | 5 G NAS key set identifier | | | | octet 2 |

The 5G NAS key set identifier is configured at bits 1 to 4 of octet 2, and the type of security context flag (TSC) is configured at bit 8 of octet 2.

According to an embodiment, the type of security context flag (TSC) and the 5G NAS key set identifier in Table 40 may be configured as shown in the following Table 41.

TABLE 41

Type of security context flag (TSC) (octet 2)

Bit 8
0    native security context (for $KSI_{AMF}$)
1    mapped security context (for $KSI_{ASME}$)
TSC does not apply for NAS key set identifier value "1111".

5G NAS key set identifier (octet 2)

Bits 4  3  2  1

0  0  0  0
through    possible values for the NAS key set identifier
1  1  1  0
1  1  1  1  no key is available (UE to network);
                reserved (network to UE)

The allowed NSSAI used in Table 24 may be configured as shown in the following Table 42. That is, the allowed NSSAI may be configured using parameters of the NSSAI information element.

TABLE 42

| 8 | 7 | 6 | 5 | 4 | 3 | 2 | 1 | |
|---|---|---|---|---|---|---|---|---|
| | | | NSSAI IEI | | | | | octet 1 |
| | | Length of NSSAI contents | | | | | | octet 2 |
| | | Number of S-NSSAI | | | | | | Octet 3 |
| | | S-NSSAI 1 | | | | | | octet 4 |
| | | | | | | | | octet m |
| | | S-NSSAI 2 | | | | | | octet m + 1* |
| | | | | | | | | octet n* |
| | | . . . | | | | | | octet n + 1* |
| | | | | | | | | octet u* |
| | | S-NSSAI n | | | | | | octet u + 1* |
| | | | | | | | | octet v* |

That is, specifically, it may be configured as shown in Table 43.

TABLE 43

| 8 | 7 | 6 | 5 | 4 | 3 | 2 | 1 | |
|---|---|---|---|---|---|---|---|---|
| | | Allowed NSSAI IEI | | | | | | octet 1 |
| | | Length of allowed NSSAI contents | | | | | | octet 2 |
| | | Number of allowed S-NSSAI | | | | | | Octet 3 |
| | | allowed S-NSSAI 1 | | | | | | octet 4 |
| | | | | | | | | octet m |

TABLE 43-continued

| 8 | 7 | 6 | 5 | 4 | 3 | 2 | 1 | |
|---|---|---|---|---|---|---|---|---|
| | | | allowed S-NSSAI 2 | | | | | octet m + 1* |
| | | | | | | | | octet n* |
| | | | ... | | | | | octet n + 1* |
| | | | | | | | | octet u* |
| | | | allowed S-NSSAI n | | | | | octet u + 1* |
| | | | | | | | | octet v* |

The allowed NSSAI may include a length of contents of the NSSAI, the number of S-NSSAIs included in the NSSAI, and a plurality of S-NSSAIs.

The S-NSSAI included therein may be configured by including the following parameters in the information element of the S-NSSAI of the following Table 44. That is, the S-NSSAI may include any value of the following Type of S-NSSAI flag, S-NSSAI identifier, length of S-NSSAI contents, SST and SD values. Thus, the parameters from octet 2 to 7 of Table 44 may be used.

Table 44 shows the configuration of the information element of S-NSSAI.

TABLE 44

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | S-NSSAI Identifier | | | | | Octet 2 |
| | | | Length of S-NSSAI contents | | | | | Octet 3 |
| | | | SST | | | | | octet 4 |
| | | | SD | | | | | octet 5 |
| | | | | | | | | octet 7 |

The Type of S-NSSAI flag (TSF) is set to 0 to indicate the S-NSSAI used in the HPLMN if the S-NSSAI is used in a home PLMN, and is set to 1 to indicate the S-NSSAI is used in VPLMN if the S-NSSAI is used in a visited PLMN.

TABLE 45 native S-NSSAI (for Home PLMN: HPLMN)
mapped S-NSSAI (for Visited PLMN VPLMN )

The S-NSSAI identifier is used to identify the S-NSSAI.

Slice/service type (SST) is used to distinguish a slice or a service.

Slice differentiator (SD) is used to distinguish a provider which provides each service of the slice in the slice.

Meanwhile, in yet another embodiment, the S-NSSAI may include the following parameters in the information element of the S-NSSAI. That is, the S-NSSAI may include any one of the following Type of S-NSSAI flag, S-NSSAI identifier, length of the S-NSSAI contents, SST, SD, mapped subscribed SST, and mapped subscribed SD values. Herein, the mapped subscribed SST and the mapped subscribed SD may be used to inform the subscribed SST and the subscribed SD for mapping the corresponding S-NSSAI in the VPLMN. Thus, the parameters from octet 2 to 11 of Table 46 may be used.

Table 46 describes the configuration of the information element of the S-NSSAI.

TABLE 46

| 8 | 7 | 6 | 5 | 4 | 3 | 2 | 1 | |
|---|---|---|---|---|---|---|---|---|
| S-NSSAI IEI | | | | | | | | Octet 1 |
| TSF | | S-NSSAI Identifier | | | | | | Octet 2 |

TABLE 46-continued

| | |
|---|---|
| Length of S-NSSAI contents | Octet 3 |
| SST | octet 4 |
| | octet 5 |
| SD | |
| | octet 7 |
| mapped subscribed SST | octet 8 |
| | octet 9 |
| mapped subscribed SD | |
| | octet 11 |

The Mapping of Allowed NSSAI used in Table 24 may be configured as shown in the following Table 47.

TABLE 47

| 8 | 7 | 6 | 5 | 4 | 3 | 2 | 1 | |
|---|---|---|---|---|---|---|---|---|
| | | | NSSAI IEI | | | | | octet 1 |
| | | | Length of NS SAT contents | | | | | octet 2 |
| | | | Number of S-NSSAI | | | | | Octet 3 |
| | | | S-NSSAI 1 | | | | | octet 4 |
| | | | | | | | | octet m |
| | | | S-NSSAI 2 | | | | | octet m + 1* |
| | | | | | | | | octet n* |
| | | | ... | | | | | octet n + 1* |
| | | | | | | | | octet u* |
| | | | S-NSSAI n | | | | | octet u + 1* |
| | | | | | | | | octet v* |

That is, specifically, it may be configured as shown in Table 48.

TABLE 48

| 8 | 7 | 6 | 5 | 4 | 3 | 2 | 1 | |
|---|---|---|---|---|---|---|---|---|
| | | | Mapping of Allowed NSSAI IEI | | | | | octet 1 |
| | | | Length of mapping allowed NSSAI contents | | | | | octet 2 |
| | | | Number of mapping of allowed S-NSSAI | | | | | Octet 3 |
| | | | mapping of allowed S-NSSAI 1 | | | | | octet 4 |
| | | | | | | | | octet m |
| | | | mapping of allowed S-NSSAI 2 | | | | | octet m + 1* |
| | | | | | | | | octet n* |
| | | | ... | | | | | octet n + 1* |
| | | | | | | | | octet u* |
| | | | mapping of allowed S-NSSAI n | | | | | octet u + 1* |
| | | | | | | | | octet v* |

This Mapping of allowed NSSAI may include the length of contents of NSSAI, the number of S-NSSAIs included in NSSAI, and a plurality of S-NSSAIs.

The S-NSSAI included therein may be configured by including the following parameters in the information element of the S-NSSAI in the following Table 49. That is, the S-NSSAI may include any one value of the following Type of S-NSSAI flag, S-NSSAI identifier, length of S-NSSAI contents, SST and SD values. Hence, the parameters from octet 2 to 7 of Table 49 may be used.

Table 49 describes the configuration of the information element of the S-NSSAI.

TABLE 49

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | S-NSSAI Identifier | | | | | Octet 2 |
| | | | Length of S-NSSAI contents | | | | | Octet 3 |
| | | | SST | | | | | octet 4 |
| | | | SD | | | | | octet 5 |
| | | | | | | | | octet 7 |

The TSF is set to 0 to indicate the S-NSSAI used in the HPLMN if the S-NSSAI is used in the home PLMN, and is set to 1 to indicate the S-NSSAI used in the VPLMN if the S-NSSAI is used in the visited PLMN.

TABLE 50 native S-NSSAI (for Home PLMN: HPLMN)
mapped S-NSSAI (for Visited PLMN VPLMN)

The S-NSSAI identifier is used to identify the S-NSSAI.
SST is used to distinguish the slice or the service.
SD is used to distinguish the provider which provides each service of the slice in a slice.

Meanwhile, in still another embodiment, the S-NSSAI may include the following parameters in the information element of the S-NSSAI. That is, the S-NSSAI may include any one value of the following Type of S-NSSAI flag, S-NSSAI identifier, length of S-NSSAI contents, SST, SD, mapped subscribed SST, and mapped subscribed SD values. Herein, the mapped subscribed SST and the mapped subscribed SD may be used to inform the subscribed SST and the subscribed SD for mapping in the VPLMN for the corresponding S-NSSAI.

Table 52 describes the configuration of the information element of the S-NSSAI.

If the TSF of octect2 is native, that is, is the S-NSSAI available in HPLMN in the following Table 52, it may include multiple SNSSAIs mapped thereto.

Hence, the TSF is set to 0 to indicate the S-NSSAI used in the HPLMN if the S-NSSAI is used in the home PLMN, and is set to 1 to indicate the S-NSSAI used in the VPLMN if the S-NSSAI is used in the visited PLMN.

TABLE 51 native S-NSSAI (for Home PLMN: HPLMN)
mapped S-NSSAI (for Visited PLMN VPLMN)

The S-NSSAI identifier is used to identify the S-NSSAI.
SST is used to distinguish a slice or a service.
SD is used to distinguish the provider which provides each service of the slice in the slice.

TABLE 52

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | S-NSSAI Identifier | | | | | Octet 2 |
| | | Total Length of S-NSSAI contents | | | | | | Octet 3 |
| | | Total number of mapped S-NSSAI | | | | | | Octet 4 |
| | | Length of S-NSSAI contents | | | | | | Octet 5 |
| | | | SST | | | | | octet 6 |
| | | | SD | | | | | octet 7 |
| | | | | | | | | octet 9 |
| TSF | | | S-NSSAI Identifier | | | | | Octet n |
| | | Length of S-NSSAI contents | | | | | | Octet n + 1 |
| | | | SST | | | | | octet n + 2 |
| | | | SD | | | | | octet n + 3 |
| | | | | | | | | octet n + 5 |
| TSF | | | S-NSSAI Identifier | | | | | Octet m |
| | | Length of S-NSSAI contents | | | | | | Octet |
| | | | SST | | | | | octet |
| | | | SD | | | | | octet |
| | | | | | | | | octet |

For example, it is said that the TSF value of the corresponding S-NSSAI is 0 with respect to the S-NSSAI identifier of the octet 2 and is the S-NSSAI allocated in the corresponding HPLMN. Total length of s-NSSAI contest to be set indicates the total length, and total number of mapped S-NSSAI indicates the S-NSSAI of VPLMM mapped to the S-NSSAI allocated in the corresponding HPLMN. Next, from octet 4 to octet 9 indicate information of the S-NSSAI which may be used in the corresponding HPLMN.

Meanwhile, herein, as an embodiment, octet n to octet n+5 and octet m to octet m+5 are used to give the mapping value of S-NSSAI in the VPLMN available by mapping to the S-NSSAI of the HPLMN of the octet 2. Hence, the TSF of octet 2 is set to 0, the TSF of octet n is set to 1, and the TSF of octet m is also set to 1.

Herein, for example, if the octet 2 has one allowed NSSAI in the home, the mapping of allowed NSSAIs in the corresponding VPLMN is two including octet n to octet n+5 and octet m to octet m+5.

That is, one set of the mapping of allowed NSSAI is configured as shown in the following Table 53.

TABLE 53

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | Allowed S-NSSAI Identifier | | | | | Octet 2 |
| | Total Length of allowed and mapping of allowed S-NSSAI contents | | | | | | | Octet 3 |
| | | Total number of mapped S-NSSAI | | | | | | Octet 4 |
| | | Length of allowed S-NSSAI contents | | | | | | Octet 5 |
| | | | SST | | | | | octet 6 |
| | | | SD | | | | | octet 7 |
| | | | | | | | | octet 9 |
| TSF | | Mapping of allowed S-NSSAI Identifier | | | | | | Octet n |
| | | Length of S-NSSAI contents | | | | | | Octet n + 1 |
| | | | SST | | | | | octet n + 2 |
| | | | SD | | | | | octet n + 3 |
| | | | | | | | | octet n + 5 |
| TSF | | Mapping of allowed S-NSSAI Identifier | | | | | | Octet m |
| | | Length of S-NSSAI contents | | | | | | Octet |
| | | | SST | | | | | octet |
| | | | SD | | | | | octet |
| | | | | | | | | octet |

Since there may be several mapping of allowed S-NSSAIs, the configuration related to the mapping of allowed S-NSSAI identifiers may vary. Herein, in this embodiment, an example including two is suggested.

It may be configured as shown in Table 54, to reduce information transmitted in this configuration scheme.

TABLE 54

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | S-NSSAI Identifier | | | | | Octet 2 |
| | | Total Length of S-NSSAI contents | | | | | | Octet 3 |
| | | Total number of mapped S-NSSAI | | | | | | Octet 4 |
| | | Length of S-NSSAI contents | | | | | | Octet 5 |
| | | | SST | | | | | octet 6 |
| | | | SD | | | | | octet 7 |
| | | | | | | | | octet 9 |
| TSF | | | S-NSSAI Identifier | | | | | Octet n |
| TSF | | | S-NSSAI Identifier | | | | | Octet m |

It may be configured as shown in Table 55, to reduce information transmitted in this configuration scheme.

TABLE 55

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | S-NSSAI Identifier | | | | | Octet 2 |
| | | Total Length of S-NSSAI contents | | | | | | Octet 3 |
| | | Total number of mapped S-NSSAI | | | | | | Octet 4 |
| TSF | | | S-NSSAI Identifier | | | | | Octet n |
| TSF | | | S-NSSAI Identifier | | | | | Octet m |

Allowed NSSAI and Mapping of Allowed NSSAI used in Table 24 may be configured together as shown in the following Table 57.

That is, the message of Table 24 may be configured as shown in Table 56. That is, it may be configured as below to transmit the information of the allowed NSSAI and the mapping of allowed NSSAI which is mapped thereto.

TABLE 56

| IEI | Information Element | Type/Reference | Presence | Format | Length |
|---|---|---|---|---|---|
| | Extended Protocol Discriminator | Extended Protocol Discriminator | M | V | 1 |
| | Security Header type | Security Header type | M | V | 1/2 |
| | Spare half octet | Spare half octet | M | V | 1/2 |
| | Procedure Transaction Identity | Procedure Transaction Identity | M | V | 1 |
| | Security mode command Message identity | Message type | M | V | 1 |
| | Selected NAS security algorithms | NAS security algorithms | M | | |
| | 5G NAS key set identifier | 5G NAS key set identifier | M | | |
| | Replayed UE security capability | UE security capability | M | | |
| | Allowed and mapping of Allowed NSSAI | NSSAI | O | | |
| | Replayed Nonce$_{EE}$ | Nonce | O | | |
| | Nonce$_{AMF}$ | Nonce | O | | |
| | Hash$_{AMF}$ | Hash$_{AMF}$ | O | | |

TABLE 57

| 8 | 7 | 6 | 5 | 4 | 3 | 2 | 1 | |
|---|---|---|---|---|---|---|---|---|
| | | | NSSAI IEI | | | | | octet 1 |
| | | | Length of NSSAI contents | | | | | octet 2 |
| | | | Number of S-NSSAI | | | | | Octet 3 |
| | | | S-NSSAI 1 | | | | | octet 4 |
| | | | | | | | | octet m |
| | | | S-NSSAI 2 | | | | | octet m + 1* |
| | | | | | | | | octet n* |
| | | | . . . | | | | | octet n + 1* |
| | | | | | | | | octet u* |
| | | | S-NSSAI n | | | | | octet u + 1* |
| | | | | | | | | octet v* |

That is, specifically, it may be configured as shown in Table 58.

TABLE 58

| 8 | 7 | 6 | 5 | 4 | 3 | 2 | 1 | |
|---|---|---|---|---|---|---|---|---|
| | | | Allowed and mapped NSSAI IEI | | | | | octet 1 |
| | | Length of allowed and mapped NSSAI contents | | | | | | octet 2 |
| | | | Number of allowed and mapped S-NSSAI | | | | | Octet 3 |
| | | | Allowed and mapped S-NSSAI 1 | | | | | octet 4 |
| | | | | | | | | octet m |
| | | | Allowed and mapped S-NSSAI 2 | | | | | octet m + 1* |
| | | | | | | | | octet n* |
| | | | . . . | | | | | octet n + 1* |
| | | | | | | | | octet u* |
| | | | allowed and mapped S-NSSAI n | | | | | octet u + 1* |
| | | | | | | | | octet v* |

This Mapping of allowed NSSAI may include the length of contents of NSSAI, the number of S-NSSAIs included in NSSAI, and a plurality of S-NSSAIs.

The S-NSSAI included therein may be configured by including the following parameters in the information element of the S-NSSAI of the following Table 59. That is, the S-NSSAI may include any one value of the following Type of S-NSSAI flag, S-NSSAI identifier, length of S-NSSAI contents, SST and SD values. Hence, the parameters from octet 2 to 7 of Table 59 may be used.

Table 59 describes the configuration of the information element of the S-NSSAI.

TABLE 59

| 8 | 7 | 6 | 5 | 4 | 3 | 2 | 1 | |
|---|---|---|---|---|---|---|---|---|
| | | | S-NSSAI IEI | | | | | Octet 1 |
| TSF | | | S-NSSAI Identifier | | | | | Octet 2 |
| | | | Length of S-NSSAI contents | | | | | Octet 3 |
| | | | SST | | | | | octet 4 |
| | | | SD | | | | | octet 5 |
| | | | | | | | | octet 7 |

The TSF is set to 0 to indicate the S-NSSAI used in the HPLMN if the S-NSSAI is used in the home PLMN, and is set to 1 to indicate the S-NSSAI used in the VPLMN if the S-NSSAI is used in the visited PLMN.

TABLE 60 native S-NSSAI (for Home PLMN: HPLMN)
mapped S-NSSAI (for Visited PLMN VPLMN)

The S-NSSAI identifier is used to identify the S-NSSAI.
SST is used to distinguish a slice or a service.
SD is used to distinguish a provider which provides each service in the slice.

Meanwhile, in further embodiment, the S-NSSAI may be configured by including the following parameters in the information element of the S-NSSAI. That is, the S-NSSAI may include any one value of the following Type of S-NSSAI flag, S-NSSAI identifier, length of S-NSSAI contents, SST, SD, mapped subscribed SST, and mapped subscribed SD values. Herein, the mapped subscribed SST and the mapped subscribed SD may be used to inform the subscribed SST and the subscribed SD which may be mapped in the VPLMN for the corresponding S-NSSAI.

Table 61 describes the configuration of the information element of the S-NSSAI.

In Table 61, if the TSF of octect2 is native, that is, is the S-NSSAI available in the HPLMN, it may include multiple S-NSSAIs mapped thereto.

TABLE 61

| 8 | 7 | 6 | 5 | 4 | 3 | 2 | 1 | | |
|---|---|---|---|---|---|---|---|---|---|
| | | | S-NSSAI IEI | | | | | | Octet 1 |
| TSF | | | S-NSSAI Identifier | | | | | | Octet 2 |
| | | | Total Length of S-NSSAI contents | | | | | | Octet 3 |
| | | | Total number of mapped S-NSSAI | | | | | | Octet 4 |
| | | | Length of S-NSSAI contents | | | | | | Octet 5 |
| | | | SST | | | | | | octet 6 |
| | | | SD | | | | | | octet 7 octet 9 |
| TSF | | | S-NSSAI Identifier | | | | | | Octet n |
| | | | Length of S-NSSAI contents | | | | | | Octet n + 1 |
| | | | SST | | | | | | octet n + 2 |
| | | | SD | | | | | | octet n + 3 octet n + 5 |
| TSF | | | S-NSSAI Identifier | | | | | | Octet m |
| | | | Length of S-NSSAI contents | | | | | | Octet |
| | | | SST | | | | | | octet |
| | | | SD | | | | | | octet octet |

The TSF is set to 0 to indicate the S-NSSAI used in the HPLMN if the S-NSSAI is used in the home PLMN, and is set to 1 to indicate the S-NSSAI used in the VPLMN if the S-NSSAI is used in the visited PLMN.

TABLE 62

| native S-NSSAI (for Home PLMN: HPLMN) |
| mapped S-NSSAI (for Visited PLMN VPLMN) |

The S-NSSAI identifier is used to identify the S-NSSAI.

SST is used to distinguish a slice or a service.

SD is used to distinguish a provider which provides each service in a slice.

For example, it is said that the corresponding S-NSSAI is the S-NSSAI assigned in the corresponding HPLMN with the TSF value of 0 with respect to the S-NSSAI identifier of the octet 2. Total length of s-NSSAI contest to be set indicates the total length, and total number of mapped S-NSSAI indicates the S-NSSAI of VPLMM mapped to the S-NSSAI allocated in the corresponding HPLMN. Next, from octet 4 to octet 9 indicate information of the S-NSSAI which may be used in the corresponding HPLMN.

Meanwhile, herein, in an embodiment, octet n to octet n+5 and octet m to octet m+5 are used to give the mapping value of S-NSSAI in the VPLMN usable by mapping to the S-NSSAI of the HPLMN of the octet 2. Hence, the TSF of octet 2 is set to 0, the TSF of octet n is set to 1, and the TSF of octet m is also set to 1.

Herein, for example, if the octet 2 has one allowed NSSAI in the home, the mapping of allowed NSSAIs in the corresponding VPLMN is two including octet n to octet n+5 and octet m to octet m+5.

That is, one set of the mapping of allowed NSSAI is constructed as shown in the following Table 63.

TABLE 63

| 8 | 7 | 6 | 5 | 4 | 3 | 2 | 1 | | |
|---|---|---|---|---|---|---|---|---|---|
| | | | S-NSSAI IEI | | | | | | Octet 1 |
| TSF | | | Allowed S-NSSAI Identifier | | | | | | Octet 2 |
| | | | Total Length of allowed and mapping of allowed S-NSSAI contents | | | | | | Octet 3 |
| | | | Total number of mapped S-NSSAI | | | | | | Octet 4 |
| | | | Length of allowed S-NSSAI contents | | | | | | Octet 5 |
| | | | SST | | | | | | octet 6 |
| | | | SD | | | | | | octet 7 octet 9 |
| TSF | | | Mapping of allowed S-NSSAI Identifier | | | | | | Octet n |
| | | | Length of S-NSSAI contents | | | | | | Octet n + 1 |
| | | | SST | | | | | | octet n + 2 |
| | | | SD | | | | | | octet n + 3 octet n + 5 |
| TSF | | | Mapping of allowed S-NSSAI Identifier | | | | | | Octet m |
| | | | Length of S-NSSAI contents | | | | | | Octet |
| | | | SST | | | | | | octet |
| | | | SD | | | | | | octet octet |

Since there may be several mapping of allowed S-NSSAIs, the configuration related to the mapping of allowed S-NSSAI identifiers may vary. Herein, in this embodiment, an example including two is suggested.

It may be configured as shown in Table 64, to reduce information transmitted in this configuration scheme.

TABLE 64

| 8 | 7 | 6 | 5 | 4 | 3 | 2 | 1 | | |
|---|---|---|---|---|---|---|---|---|---|
| | | | S-NSSAI IEI | | | | | | Octet 1 |
| TSF | | | S-NSSAI Identifier | | | | | | Octet 2 |
| | | | Total Length of S-NSSAI contents | | | | | | Octet 3 |
| | | | Total number of mapped S-NSSAI | | | | | | Octet 4 |
| | | | Length of S-NSSAI contents | | | | | | Octet 5 |
| | | | SST | | | | | | octet 6 |
| | | | SD | | | | | | octet 7 octet 9 |
| TSF | | | S-NSSAI Identifier | | | | | | Octet n |
| TSF | | | S-NSSAI Identifier | | | | | | Octet m |

It may be configured as shown in Table 65, to reduce information transmitted in this configuration scheme.

TABLE 65

| 8 | 7 | 6 | 5 | 4 | 3 | 2 | 1 | | |
|---|---|---|---|---|---|---|---|---|---|
| | | | S-NSSAI IEI | | | | | | Octet 1 |
| TSF | | | S-NSSAI Identifier | | | | | | Octet 2 |
| | | | Total Length of S-NSSAI contents | | | | | | Octet 3 |
| | | | Total number of mapped S-NSSAI | | | | | | Octet 4 |
| TSF | | | S-NSSAI Identifier | | | | | | Octet n |
| TSF | | | S-NSSAI Identifier | | | | | | Octet m |

The methods according to the embodiments described in the claims or the specification of the present disclosure may be implemented in hardware, software, or a combination of hardware and software.

For the software implementation, a computer-readable storage medium which stores one or more programs (software modules) may be provided. One or more programs stored in the computer-readable storage medium may be configured for execution by one or more processors of an electronic device. One or more programs may include instructions for enabling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable ROM (EEPROM), a magnetic disc storage device, a compact disc (CD)-ROM, digital versatile discs (DVDs) or other optical storage devices, and a magnetic cassette. Alternatively, the programs may be stored to a memory combining part or all of them. Also, a plurality of memories may be included.

Also, the programs may be stored in an attachable storage device accessible via a communication network such as Internet, Intranet, LAN, wide LAN (WLAN), or storage area network (SAN), or a communication network by combining these networks. Such a storage device may access an apparatus which realizes an embodiment of the present disclosure through an external port. Also, a separate storage device on the communication network may access the apparatus which realizes an embodiment of the present disclosure.

In the specific embodiments of the present disclosure as described above, the elements included in the disclosure are expressed in a singular or plural form. However, the singular or plural expression is appropriately selected according to a proposed situation for the convenience of explanations, the present disclosure is not limited to a single element or a plurality of elements, the elements expressed in the plural form may be configured as a single element, and the elements expressed in the singular form may be configured as a plurality of elements.

Meanwhile, the detailed description of the present disclosure has been described with reference to certain embodiments thereof, but various modifications may be made without departing from the scope of this disclosure. Therefore, the scope of this disclosure should not be limited to the described embodiments but should be defined by the claims as below and their equivalents within the scope of the claims.

The invention claimed is:

1. A method performed by an access and mobility management function (AMF), the method comprising:
   receiving, from a source mobility management entity (MME) a forward relocation request message;
   transmitting, to a target 5G radio access network (RAN) node, a handover request message including a non-access stratum (NAS) container;
   receiving, from the target 5G RAN node, a handover request acknowledge message in response to the handover request message;
   transmitting, to the source MME, a forward relocation response message in response to the forward relocation request message; and
   receiving, from the target 5G RAN node, a handover notify message,
   wherein the NAS container includes a type of ciphering algorithm, a type of integrity protection algorithm, a type of security context flag, and a key set identifier for 5G,
   wherein the type of security context flag is one bit, and
   wherein a first value of the type of security context flag indicates that the security context is native, and a second value of the type of security context flag indicates that the security context is mapped.

2. The method of claim 1, wherein the type of ciphering algorithm is 4 bits.

3. The method of claim 1, wherein the type of integrity protection algorithm is 4 bits.

4. The method of claim 2, wherein a first value of the type of ciphering algorithm indicates that the ciphering algorithm is not used, and
   wherein a second value of the type of ciphering algorithm, which is different from the first value of the type of ciphering algorithm indicates a 128-bit ciphering algorithm.

5. The method of claim 3, wherein a first value indicating the type of integrity protection algorithm indicates that the integrity protection algorithm is not used, and
   wherein a second value of the type of integrity protection alogroithm, which is different from the first value of the type of integrity protection algorithm indicates a 128-bit integrity protection algorithm.

6. The method of claim 1, wherein the type of security context flag is indicated by 1 bit.

7. The method of claim 1, wherein the first value is 1, and the second value is 0.

8. The method of claim 1, wherein the key set identifier for 5G is 3 bits, and the key set identifier for 5G is allocated by a network.

9. The method of claim 1, further comprising:
   after receiving the handover notify message, receiving a registration request from a user equipment (UE);
   transmitting, to the UE, a security mode command message including information on UE security capability; and
   receiving, from the UE, a security mode complete message.

10. A method performed by a user equipment (UE), in a wireless communication system, the method comprising:
    receiving a handover command message including security parameters; and
    transmitting a handover acknowledge message in response to receiving the handover command message,
    wherein the security parameters include a type of ciphering algorithm, a type of integrity protection algorithm, a type of security context flag, and a key set identifier for 5G
    wherein the type of security context flag is one bit, and
    wherein a first value of the type of security context flag indicates that the security context is native, and a second value of the type of security context flag indicates that the security context is mapped.

11. The method of claim 10, wherein the type of ciphering algorithm is 4 bits,
    wherein the type of integrity protection algorithm is indicated by 4 bits, and
    wherein the 5G key set identifier is 3 bits.

12. The method of claim 11, wherein a first value of the type of ciphering algorithm indicates that the ciphering algorithm is not used,
    wherein a seond value of the type of ciphering algorithm, which is different from the first value of the type of ciphering algorithm indicates a 128-bit ciphering algorithm,
    wherein a first value indicating the type of integrity protection algorithm indicates that the integrity protection algorithm is not used, and wherein a second value of the type of integrity protection algorithm, which is different from the first value of the type of integrity protection algorithm indicates a 128-bit integrity protection algorithm.

13. The method of claim 10, further comprising:
transmitting a registration request message comprising security capability information of the UE,
wherein the security capability information of the UE indicates a 5G ciphering algorithm, a 5G integrity algorithm, and an evolved packet system (EPS) algorithm used in an evolved universal mobile telecommunications system (eUTRAN).

14. A method performed by a 5$^{th}$ generation radio access network (RAN) node, in a wireless communication system, the method comprising,
receiving, from an access and mobility management function (AMF), a handover request message including a non-access stratum (NAS) container;
transmitting, to the AMF, a handover request acknowledge message in response to the handover request message;
receiving, from a user equipment (UE), a handover acknowledge message; and
transmitting, to the AMF, a handover notify message in response to the handover acknowledge message,
wherein the NAS container includes a type of ciphering algorithm, a type of integrity protection algorithm, a type of security context flag, and a key set identifier for 5G
wherein the type of security context flag is one bit, and
wherein a first value of the type of security context flag indicates that the security context is native, and a second value of the type of security context flag indicates that the security context is mapped.

15. The method of claim 14, wherein the type of ciphering algorithm is 4 bits, and
wherein the type of integrity protection algorithm is indicated by 4 bits.

16. The method of claim 15, wherein a first value of the type of ciphering algorithm indicates that the ciphering algorithm is not used,
wherein a second value of the type of ciphering algorithm, which is different from the first value of the type of ciphering algorithm indicates a 128-bit ciphering algorithm,
wherein a first value indicating the type of integrity protection algorithm indicates that the integrity protection algorithm is not used, and
wherein a second value of the type of integrity protection algorithm, which is different from the first value of the type of integrity protection algorithm indicates a 128-bit integrity protection algorithm.

17. The method of claim 14, wherein the 5G key set identifier is 3 bits, and the key set identifier for 5G is allocated by a network, and wherein the first value is 1, and the second value is 0.

18. An access and mobility management function (AMF), in a wireless communication system, comprising:
at least one transceiver; and
at least one processor coupled to the at least one transceiver,
wherein the at least one processor is configured to:
receive, from a source mobility management entity (MME), a forward relocation request message,
transmit, to a target 5G radio access network (RAN) node, a handover request message including a non-access stratum (NAS) container,
receive, from the target 5G RAN node, a handover request acknowledge message in response to the handover request message,
transmit, to the source MME a forward relocation response message in response to the forward relocation request message, and
receive, from the target 5G RAN node, a handover notify message, and
wherein the NAS container includes a type of ciphering algorithm, a type of integrity protection algorithm, a type of security context flag, and a key set identifier for 5G,
wherein the type of security context flag is one bit, and
wherein a first value of the type of security context flag indicates that the security context is native, and a second value of the type of security context flag indicates that the security context is mapped.

19. A user equipment (UE), in a wireless communication system, comprising:
at least one transceiver; and
at least one processor coupled to the at least one transceiver,
wherein the at least one processor is configured to:
receive a handover command message including security parameters; and
transmit a handover acknowledge message in response to receiving the handover command message, and
wherein the security parameters include a type of ciphering algorithm, a type of integrity protection algorithm, a type of security context flag, and a key set identifier for 5G,
wherein the type of security context flag is one bit, and
wherein a first value of the type of security context flag indicates that the security context is native, and a second value of the type of security context flag indicates that the security context is mapped.

20. A 5th generation radio access network, RAN, node, in a wireless communication system, comprising:
at least one transceiver; and
at least one processor coupled to the at least one transceiver,
wherein the at least one processor is configured to:
receive, from an access and mobility management function (AMF), a handover request message including a non-access stratum (NAS) container,
transmit, to the AMF, a handover request acknowledge message in response to the handover request message,
receive, from a user equipment (UE), a handover acknowledge message, and
transmit, to the AMF, a handover notify message in response to the handover acknowledge message, and
wherein the NAS container includes a type of ciphering algorithm, a type of integrity protection algorithm, a type of security context flag, and a key set identifier for 5G,
wherein the type of security context flag is one bit, and
wherein a first value of the type of security context flag indicates that the security context is native, and a second value of the type of security context flag indicates that the security context is mapped.

* * * * *